US009080885B2

(12) United States Patent
Kocienda

(10) Patent No.: US 9,080,885 B2
(45) Date of Patent: Jul. 14, 2015

(54) DETERMINING TO DISPLAY DESIGNATIONS OF POINTS OF INTEREST WITHIN A MAP VIEW

(75) Inventor: Kenneth L. Kocienda, San Jose, CA (US)

(73) Assignee: Apple Inc., Cupertino, CA (US)

( * ) Notice: Subject to any disclaimer, the term of this patent is extended or adjusted under 35 U.S.C. 154(b) by 230 days.

(21) Appl. No.: 13/619,209

(22) Filed: Sep. 14, 2012

(65) Prior Publication Data

US 2013/0321466 A1   Dec. 5, 2013

Related U.S. Application Data

(60) Provisional application No. 61/655,912, filed on Jun. 5, 2012.

(51) Int. Cl.
| | |
|---|---|
| *G01C 21/26* | (2006.01) |
| *G01C 21/36* | (2006.01) |
| *G06T 3/40* | (2006.01) |
| *G06F 17/30* | (2006.01) |

(52) U.S. Cl.
CPC .............. *G01C 21/26* (2013.01); *G01C 21/367* (2013.01); *G06F 17/3053* (2013.01); *G06F 17/3087* (2013.01); *G06T 3/40* (2013.01)

(58) Field of Classification Search
CPC .. G01C 21/3679; G01C 21/32; G01C 21/367; G01C 21/3635; G01C 21/3667; G09B 29/006
USPC .......... 701/532, 438, 426, 409, 455; 340/995.1, 990, 995.19, 995.24, 340/995.14; 707/E17.018, 724, 754
See application file for complete search history.

(56) References Cited

U.S. PATENT DOCUMENTS

| | | | |
|---|---|---|---|
| 6,330,858 B1* | 12/2001 | McDonough et al. ........ | 101/208 |
| 6,973,386 B2* | 12/2005 | Gibbs ...................... | 340/995.14 |
| 8,060,510 B2 | 11/2011 | Ghanekar et al. | |
| 8,438,156 B2* | 5/2013 | Redstone et al. ............. | 707/724 |
| 8,830,271 B1* | 9/2014 | Jordan et al. .................. | 345/660 |
| 2007/0268310 A1* | 11/2007 | Dolph et al. .................. | 345/629 |
| 2009/0055087 A1 | 2/2009 | Beacher | |
| 2009/0079587 A1* | 3/2009 | Satoh ........................... | 340/905 |

(Continued)

FOREIGN PATENT DOCUMENTS

| | | |
|---|---|---|
| JP | 2005-10091 | 1/2005 |
| WO | 2009/072725 | 6/2009 |

*Primary Examiner* — Carlos Perromat
(74) *Attorney, Agent, or Firm* — Robert C. Kowert; Meyertons, Hood, Kivlin, Kowert & Goetzel, P.C.

(57) ABSTRACT

Methods and apparatus for a map tool for determining which points of interest in a map region for which to display designations or labels in a map view such that a displayed designation does not disappear and reappear as a user zooms in or out of a map view or as a user pans across a map region. Also disclosed are methods and apparatus for a ranking tool that uses a hierarchy of categories in order to classify points of interest, where for each given hierarchical category, the points of interest within the given hierarchical category are further ranked according to ranking data for each given point of interest and also ranked according to the quantity of the ranking data for the given point of interest.

25 Claims, 19 Drawing Sheets

(56) References Cited

U.S. PATENT DOCUMENTS

| | | | |
|---|---|---|---|
| 2009/0132485 A1* | 5/2009 | Reed et al. | 707/3 |
| 2010/0077259 A1* | 3/2010 | Inoue et al. | 714/45 |
| 2010/0280747 A1* | 11/2010 | Achthoven | 701/200 |
| 2011/0161875 A1* | 6/2011 | Kankainen | 715/810 |
| 2011/0184945 A1* | 7/2011 | Das et al. | 707/724 |
| 2012/0200606 A1* | 8/2012 | Jetha et al. | 345/660 |
| 2012/0254186 A1* | 10/2012 | Winner et al. | 707/740 |
| 2014/0047366 A1* | 2/2014 | Pegg et al. | 715/765 |

\* cited by examiner

DETERMINING TO DISPLAY DESIGNATIONS OF POINTS OF INTEREST WITHIN A MAP VIEW

This application claims benefit of priority to U.S. Provisional Application Ser. No. 61/655,912, entitled "Determining to Display Designations of Points of Interest Within a Map View," filed Jun. 5, 2012.

BACKGROUND

Mobile devices often provide various mapping related features such as displaying a map view for a region. Further, users often have the option to enable the display of designations of points of interest. For example, for a map view of a portion of a city, a user may elect to display or search for restaurants or other points of interest through a user interface for a mapping application. As a result, the map view of the portion of the city is overlaid with designations for restaurants within the map view, for example, by dropping a pin and an information box next to the pin proximate to the location of a restaurant. However, in traditional map views as a user zooms in or out of the map view, some designations for points of interest may appear or disappear based on algorithms that select designations for points of interest to display based only on ranking information within a current map view.

SUMMARY

In some embodiments, a map tool may determine a set of points of interest for which to display designations in a map view of a map region such that determined set of points of interest prevents the appearance and disappearance of the displayed designations as a user modifies the map view. For example, the map tool may access, for points of interest in a map region, ranking data for the points of interest. Given the points of interest in the map region and for current display area of a map view of the map region, the map tool may determine that a display of a designation for a point of interest would not interfere with any display of any designation for any higher ranked point of interest. Further, for an expanded display area of the map view where a designation for any higher ranked point of interest would be displayed, the map tool may determine that a display of the designation of the point of interest in any expanded display area of the map view would not interfere with any display of any designation for any other higher ranked point of interest. In response to determining that the display of the designation for the point of interest would not interfere with either the display of any designation for any higher ranked point of interest in the current display area of the map view or the display of any designation of any other higher ranked point of interest in the expanded display area of the map view, the map tool may display the designation for the point of interest in the current display area of the map view for the map region.

In some embodiments, the map tool may access, for points of interest in a map region, ranking data for the points of interest. The map tool may then determine an augmented map region based on the map region as considered to be augmented by an additional map region surrounding the map region. In response to determining that a display of the designation for the point of interest would not interfere with any display of any designation for any higher ranked point of interest within the augmented map view, the map tool may display the designation of the point of interest within a map view of the map region.

In some embodiments, ranking data and a set of hierarchy levels may be used to categorize and rank points of interest for a given map region. For example, a ranking tool may access data for points of interest corresponding to a map region. The ranking tool may then access a definition of hierarchical levels for categorizing the points of interest. For each respective point of interest of the points of interest, the ranking tool may create a respective correspondence between a respective hierarchical level and the respective point of interest. In this way, each point of interest is categorized to fall into a hierarchical level. The ranking tool may then, for each given hierarchical level, rank each given point of interest corresponding to the given hierarchical level where the ranking is based on the ranking data for the given point of interest and also based on the quantity of ranking data for the given point of interest.

Figure 1A:
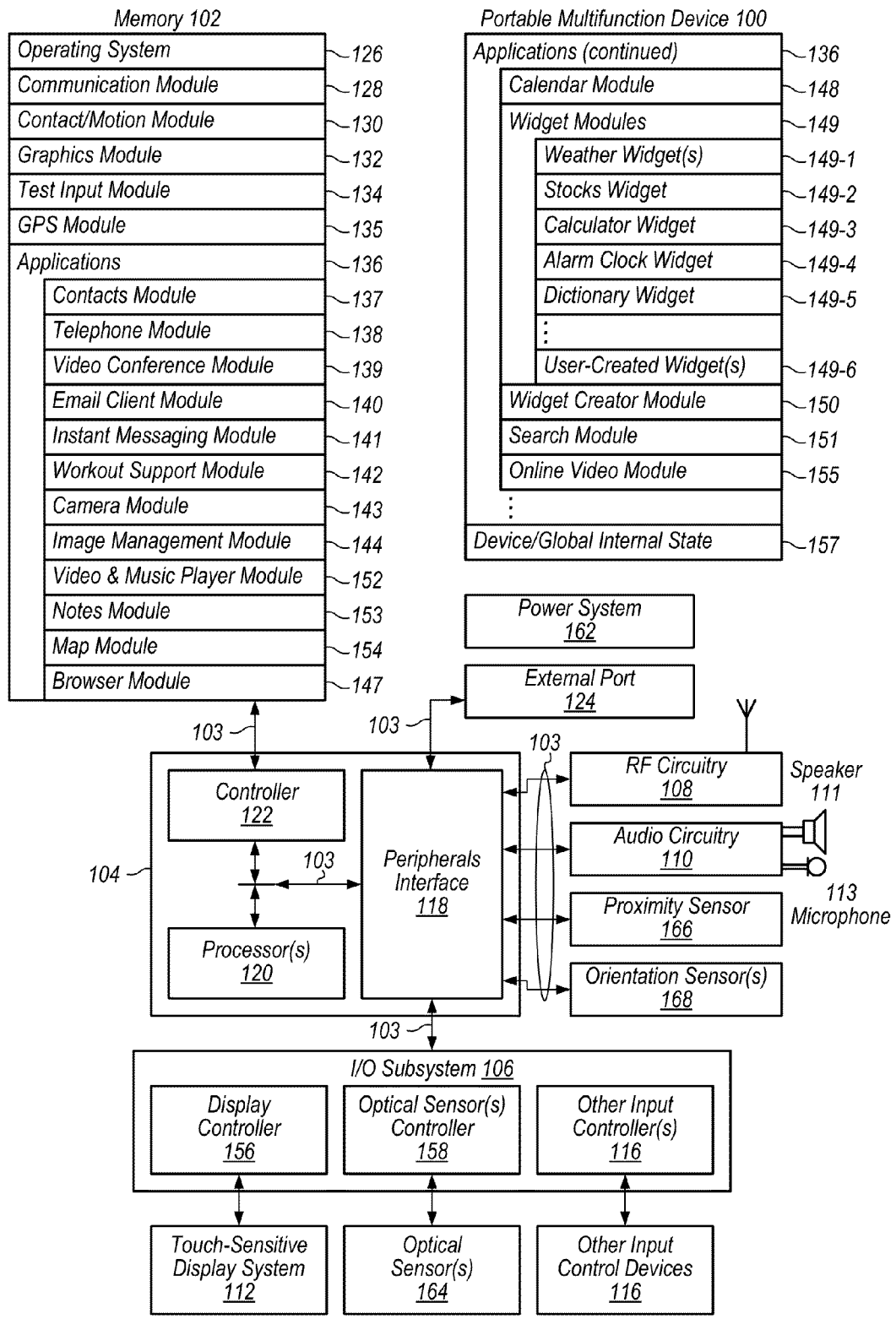
FIG. 1A is an illustration of a mobile device, according to some embodiments.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

Embodiments are presented of a map tool for which points of interest in a map region for which to display designations or labels in a map view are determined such that a displayed designation does not disappear and reappear as a user zooms in or out of a map view or as a user pans across a map region.

Embodiments are also presented of a ranking tool that uses a hierarchy of categories in order to classify points of interest, where for each given hierarchical category, the points of interest within the given hierarchical category are further ranked according to ranking data for each given point of interest and also ranked according to the quantity of the ranking data for the given point of interest.

In some embodiments, the map tool considers not only the current map view and the currently displayable designations for points of interest, but also map views which a user may possibly, but not necessarily, see rendered. The possible map views may be results of user interactions with a map tool, for example, a user may zoom in or out of a map view, or pan in any direction, rotate a map view, or for three-dimensional map view, tilt a map view. As a result of any given map interaction, and display of an initial map view to an updated map view, a map tool may have a different set of designations for points of interest that may be displayed in the initial map view than may be displayed in the updated map view. In order to provide a user with a consistent and pleasant user experience, the map tool avoids removing the display of a designation of a point of interest in a subsequent map view if the designation of the point of interest has been displayed in a current map view.

The designation of a point of interest may be annotative information such as a pin icon, an information box, or a label overlaid onto a rendering of a corresponding map view element. Other types of data may be rendered within a map view of a map region. Annotative information and designations of points of interest are used interchangeably in this description.

In providing a consistent and pleasant user experience such as the avoidance of removing from a subsequent map view annotative information displayed in a previous map view, a tradeoff may in some cases be that less than all currently displayable annotative information for a current map view may be displayed for the sake of displaying more valuable annotative information in a later map view.

In some embodiments, maintaining a consistent presentation of, for example, designations of points of interest in a map view does not mean that once a designation for a point of interest is displayed in a map view that the designation of the point of interest is rendered in all subsequent map views. For example, if a user at a current zoom level sees a designation of a point of interest, then the map tool may continue to render the designation for the point of interest at increasing zoom levels. However, if a user eventually zooms out past a zoom level at which the designation of the point of interest was not displayed, then the map tool may determine that the user would not expect to continue seeing the display of the designation of the point of interest. For example, if at an initial zoom level a user does not see a designation of a point of interest in a map view for a map region, and on zooming in the map tool does display the designation of the point of interest, when the user zooms out to the initial zoom level, the map tool may not display the designation of the point of interest. In this case, because the user did not initially see the designation of the point of interest displayed at the initial zoom level, on returning to the initial zoom level after zooming in the user would not expect to see a display of the designation of the point of interest.

In some embodiments, for any given map view of a map region, the map tool may determine whether or not to display annotative information based on available white space in the map view. In other cases, factors other than white space may be used such as whether or not rendering a designation for a point of interest in a map view would obstruct or overly obstruct a map element that does not correspond to the designation for the point of interest.

In some embodiments, the map tool may use ranking information for multiple points of interest in a map view, and where not every designation for every point of interest would fit within the map view. In some cases, the map tool may use ranking information to determine which of the points of interest to consider for displaying the corresponding designation information. For example, the set of points of interest with which the map tool may apply the herein described methods for maintaining a consistent user experience for varying map views may be determined by only considering a threshold amount of the top ranked points of interest. For example, for any given map view, the map tool may, in some cases, only use the top 15 ranked points of interest, and then given the top 15 ranked points of interest the map tool may proceed to determine which of those to display according to the various embodiments discussed herein. The threshold amount of points of interest may be defined prior to displaying any designation for a point of interest, and the threshold amount may correspond to a user adjustable setting such as "display small set of points of interest", "display regular set of points of interest", or "display large set of points of interest".

In some embodiments, a map tool, given an indication to display designations of points of interest in the display of a map view, may determine which points of interest to select for which to display designations of points of interest. For example, the map tool may determine that three points of interest may possibly be displayed in a current map view. For example, points of interest corresponding to designations 506, 508, and 510 in FIG. 5A. These three points of interest may be determined using a threshold value for a quantity of designations of points of interest to display or based on there only being three points of interest in a current map view. In either case, given the three points of interest, the map tool may determine whether displays of the designations of the points of interest fit within the current map view. For example, if designations for the three points of interest all fit within the current map view, the map tool may, without further processing, render the designations for the three points of interest.

However, in the case that any one of the displays of a designation of a point of interest would interfere, or overlap, or collide with the display of a designation of another point of interest, then the map tool may determine which of the designations of the points of interest to display. Examples of interference may be when two points of interest are near each other in a map region and if both designations for both points of interest were to be drawn, then at least one of the designations of a point of interest would be covered by the display of the designation of the other point of interest. Another example of interference may be when designations of two points of interest may only be displayable such that the display of both points of interest would be cluttered or violate a minimal standard for space between displays of designations of points of interest or if the display of both designations of points of interest would be confusing.

Further in this example, for the purpose of description, consider the designations for the three points of interest to be POI1, POI2, and POI3, where POI1 is, based on ranking information, ranked higher than POI2, and POI2 is ranked higher than POI3. With regard to FIG. 5A, POI1 corresponds to designation 506, POI2 corresponds to designation 508, and POI3 corresponds to designation 510. Further in this example, for a current map view for a current zoom level, L1 (corresponding to map view 500 in FIG. 5A), POI1 interferes with POI2, and POI1 does not interfere with POI3;

for a map view at a zoomed in zoom level, L2 (corresponding to map view 502 in FIG. 5B), POI1 still interferes with POI2, and POI1 still does not interfere with POI3; and for a map view at a zoomed in zoom level, L3 (corresponding to map view 504 in FIG. 5C), POI1 does not interfere with POI2, and POI1 does not interfere with POI3.

In this example, because the designation for the higher ranked point of interest, POI2, is displayable if a user zooms in two zoom levels, the map tool determines not to display POI3 at zoom level L1 even though POI3 does not interfere with POI1, and the map tool makes this determination in order to be able to display POI2 at zoom level L3. Conceptually, what the map tool has done at zoom level L1 is reserve an area of the map view in order for POI2 to be displayable when the map view is at zoom level L3, and where the "reservation" of the map view area prevents the display of POI3 even though the display of POI3 at zoom level L1 would not interfere with POI1. An effect of the "reservation" is that POI3 is not displayed in the map view at zoom level L1 and then when the map view at zoom level L3 is reached, the display of POI3 is replaced by the display of POI2.

In this example, the map tool, by not simply determining the designations to display based on ranking information and what currently is displayable without interference in a map view, avoids the appearance and subsequent disappearance of a designation of a point of interest, thereby allowing for a more consistent and pleasant user experience.

In other words, in this example, the map tool not only considers, for a given point of interest, interference between a designation of the given point of interest and designations of higher ranked points of interest displayable at a current zoom level, the map tool considers interference between the designation of the given point of interest and designations of higher ranked points of interest at some subsequent zoom level where the higher ranked points of interest would be displayed.

In some embodiments, the map tool may implement panning a map view to share behavior characteristics of determining which designations of points of interest to display as when a user zooms in and zooms out of a map view.

Figure 6:
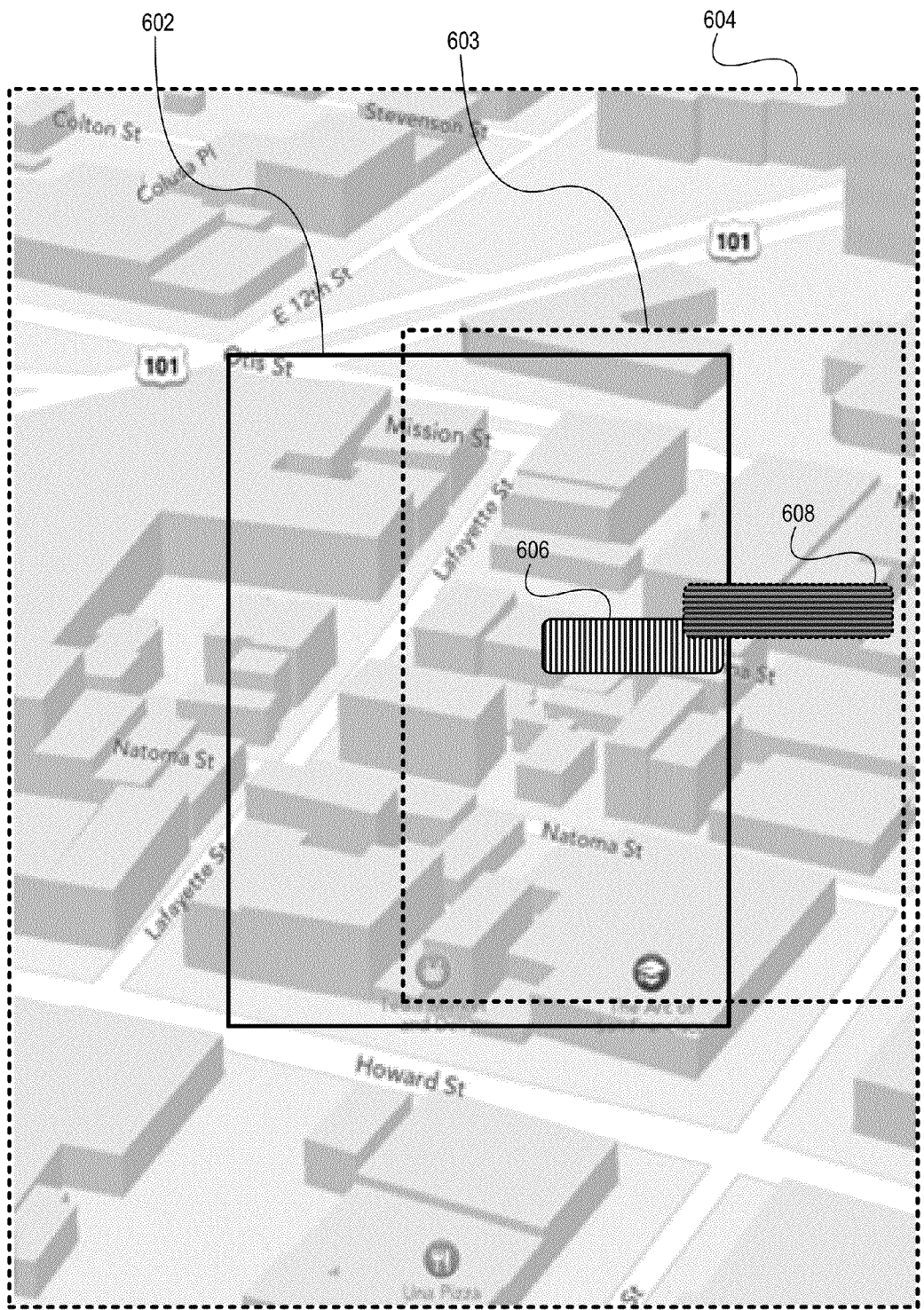
FIG. 6 illustrates a representations of a map region and buffer area surrounding the map region used by a map tool, according to some embodiments.

In regard to FIG. 6 for example, for a given map view, map view 602, there may be a point of interest near the edge of the map view, and where the designation of the point of interest, designation 606, is displayable within the current map view. In this example, map view 602 would be the map view visible within a display area such as display area 312. However, in this example, there may be a higher ranked point of interest beyond the map region corresponding to the current map view. In such a case, to avoid the display of the designation 606 of the point of interest in the current map view and the disappearance of the display of the designation 606 of the point of interest when the user pans the map view such that the designation 608 of the higher ranked point of interest is displayable, the map tool may determine not to display the designation of the lower ranked point of interest. In this example, even though it appears that a portion of the designation 608 is displayed in map view 602, this portion is not displayed by the map tool because the map tool may determine that not enough of the designation is displayable to convey useful information to a user.

In this example, to avoid the appearance and disappearance of the display of the designation 606 of the lower ranked point of interest, the map tool may determine which designations for points of interest to consider based on a map region that is larger than the map region from which the current map view is based. In this example, the larger map region is depicted by the map region corresponding to map view 604, which encompasses the map region corresponding to map view 602.

As noted above in this example, there are two points of interest, where a designation 606 for the lower ranked point of interest is displayable in a current map view, and where a designation 608 for the higher ranked point of interest is displayable in a map view 603 that is a result of a user panning to a different map region. To avoid the appearance and disappearance of the designation 606 of the lower ranked point of interest, the map tool considers a map region that includes both the lower ranked point of interest and the higher ranked point of interest, which in this example corresponds to the map view 604. Using the larger map region, the map tool determines that the designation 68 for the higher ranked point of interest should be displayed in map view 604 for the expanded map region instead of the designation 608 for the lower ranked point of interest. Using the larger map region as the basis for determining which designations to display allows the map tool to avoid displaying designation 606 and then when the user pans to the map region corresponding to map view 603, the map tool does not display designation 606 and displays designation 608 when the user pans to display map view 603.

Another way to consider this process in the event of responding to panning is that the map tool determines the designations to display based on the designations that are displayable in enlarged map region 604, and on the basis of this determination, the map tool determines which designations to display, even though the designation may not be currently visible in the current map view, as is the case when the current map view is map view 602. In other words, the map tool determines interference between designations of points of interest based on points of interest beyond the current map view as if the points of interest beyond the current map view were displayed.

In some embodiments, the map tool may perform a similar determination of which designations of points of interest to display in response to a user indicating a tilt or rotation to be applied to a current map view as the map tool performs in response to panning from one map region to another map region.

While the map tool may use any ranking of the elements or points of interest within a map region, in some cases, the map tool may use a ranking generated by a ranking tool.

In some embodiments, a ranking tool may determine a ranking for points of interest in a map region based on categorizing points of interest into multiple levels of a hierarchy, and where the points of interest within a given category or hierarchical level may be further ranked with respect to each based on ranking data for a given point of interest and based on a quantity of ranking data for the given point of interest.

Figure 7:
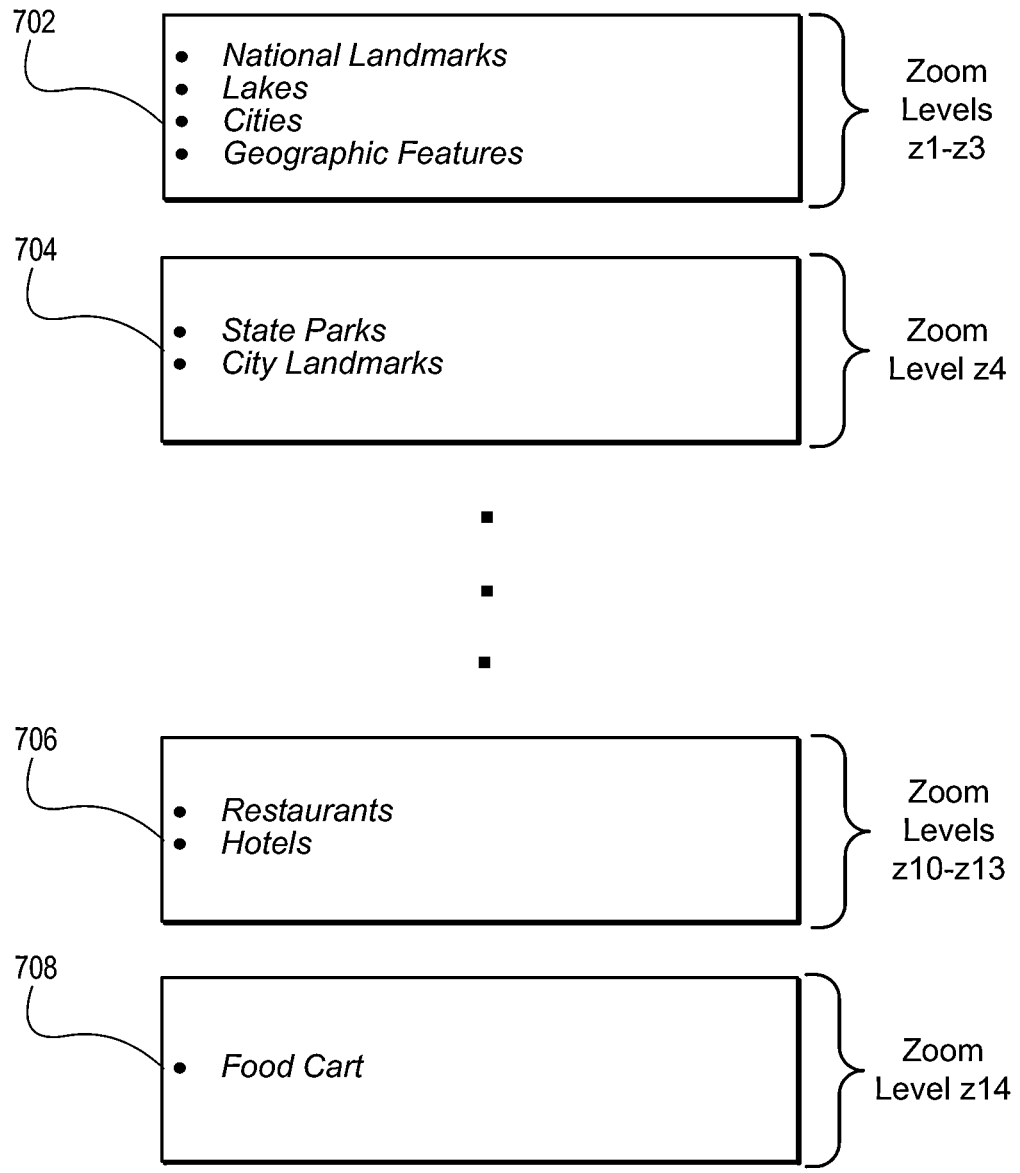
FIG. 7 illustrates example hierarchical levels for categorizing points of interest, according to some embodiments.

In some embodiments, there may be seven hierarchical levels, including hierarchical levels 702, 704, 706, and 708 in FIG. 7. In other embodiments, there may be any number of hierarchical levels and the operation of the ranking tool does not depend on any particular number of hierarchical levels.

In some embodiments, to provide a consistent and rational basis for when to display a designation for a point of interest, the ranking tool may restrict when a given point of interest becomes available for display within a given map view. For example, at a low zoom level, where a user may see a large section of a state, it may not make sense to display a designation for a hot dog stand even if there is space in the map view for the designation for the hot dog stand to be displayed.

In some embodiments, to achieve display of designations of points of interest that are consistent with a given zoom level, the ranking tool may provide points of interest that are displayable that are drawn from points of interest categorized into a given hierarchical level. For example, for hierarchical level 702, the ranking tool may classify points of interest that are national landmarks, lakes, cities, or geographic features to be displayable if the current zoom level is z1 through z3. Similarly, at zoom level z4, the ranking tool may provide a list of points of interest that have been categorized to be within hierarchical level 704, which corresponds to classifications for state parks and city landmarks. In this example, as the user zooms in to greater and greater zoom levels, the list of points of interest displayable at the current zoom level includes elements in the map region of decreasing importance with regard to what may be interesting to a user.

Further, given a classification for a set of points of interest to a given hierarchical level, say hierarchical level 706, the ranking tool may further rank the points of interest classified to this hierarchical level. For example, hierarchical level 706 includes classifications for restaurant and hotels, therefore the ranking tool may rank the points of interest for restaurants and hotels against each other. This additional level of ranking within a hierarchical level may be based on ranking information for a given point of interest itself and also based on the quantity of ranking information for the given point of interest. For example, say a given restaurant has a mediocre ranking with regard to other restaurants, but the given restaurant is been reviewed a great number of times, or at least a greater number of times than some restaurants ranked higher. In such a case, the ranking tool may rank the given restaurant higher than another restaurant that is similarly reviewed or even reviewed better than the given restaurant on the basis of the given restaurant drawing a lot of interest, whether good or bad. In other words, if a lot of people are commenting on the given restaurant, then the ranking tool may use that as a factor to rank the given restaurant over another, similarly ranked restaurant.

In other embodiments, the ranking tool may weight or bias the rank of a given point of interest based on the current mode of a mapping application or based on search results or based on a search query. The ranking tool, instead of using the three factors of a category or hierarchical level in addition to ranking information and a quantity of ranking information, the ranking tool may further consider factors such as a navigation mode. For example, if the mapping application is in a navigation mode, then points of interest related to travel or related to the current navigation destination may be moved up in relative importance to other points of interest within the category or hierarchical level. Similarly, if a user has entered a search query for "steak house" or "chicken fried steak", then the ranking tool may add a weight factor to steakhouses or restaurants that serve chicken fried steak so that at least one steakhouse or restaurant serving chicken fried steak is the top ranked point of interest within the category or hierarchical level. In some cases, if based on the search query, the ranking tool may display a point of interest outside of the classified category or hierarchical level. In some cases, the promotion of a point of interest to a higher hierarchical level may only last for the duration of the current search.

Detailed Description Considerations

In the following detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of mobile devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Mobile Device

Attention is now directed toward embodiments of portable devices with touch-sensitive displays. FIG. 1A is a block diagram illustrating portable mobile device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer-readable storage mediums, including non-transitory computer-readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable mobile device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of multiple communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of multiple touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the mobile device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3A:
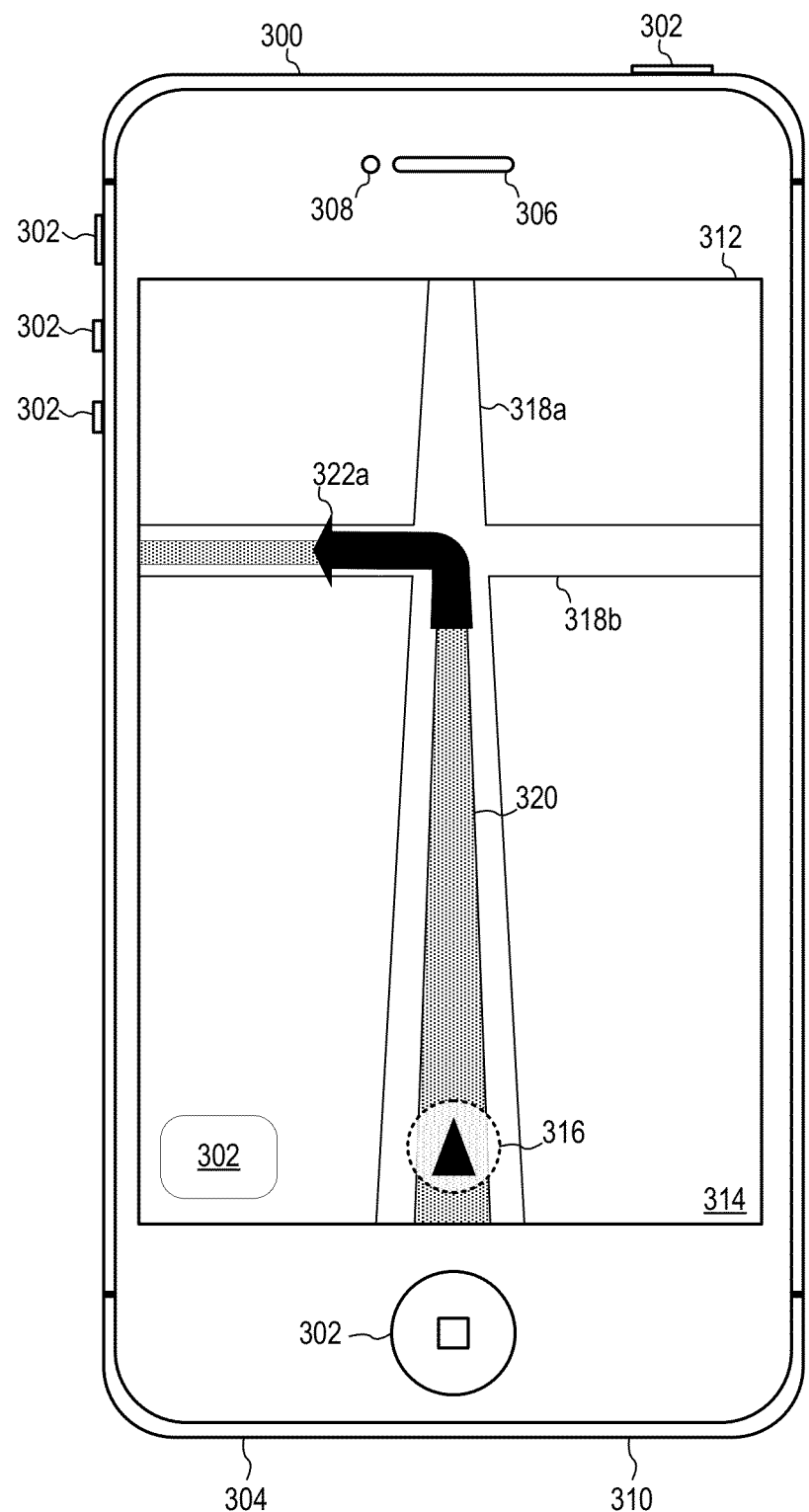
FIG. 3A illustrates another mobile device configurable to implement a map tool, according to some embodiments.
Figure 3B:
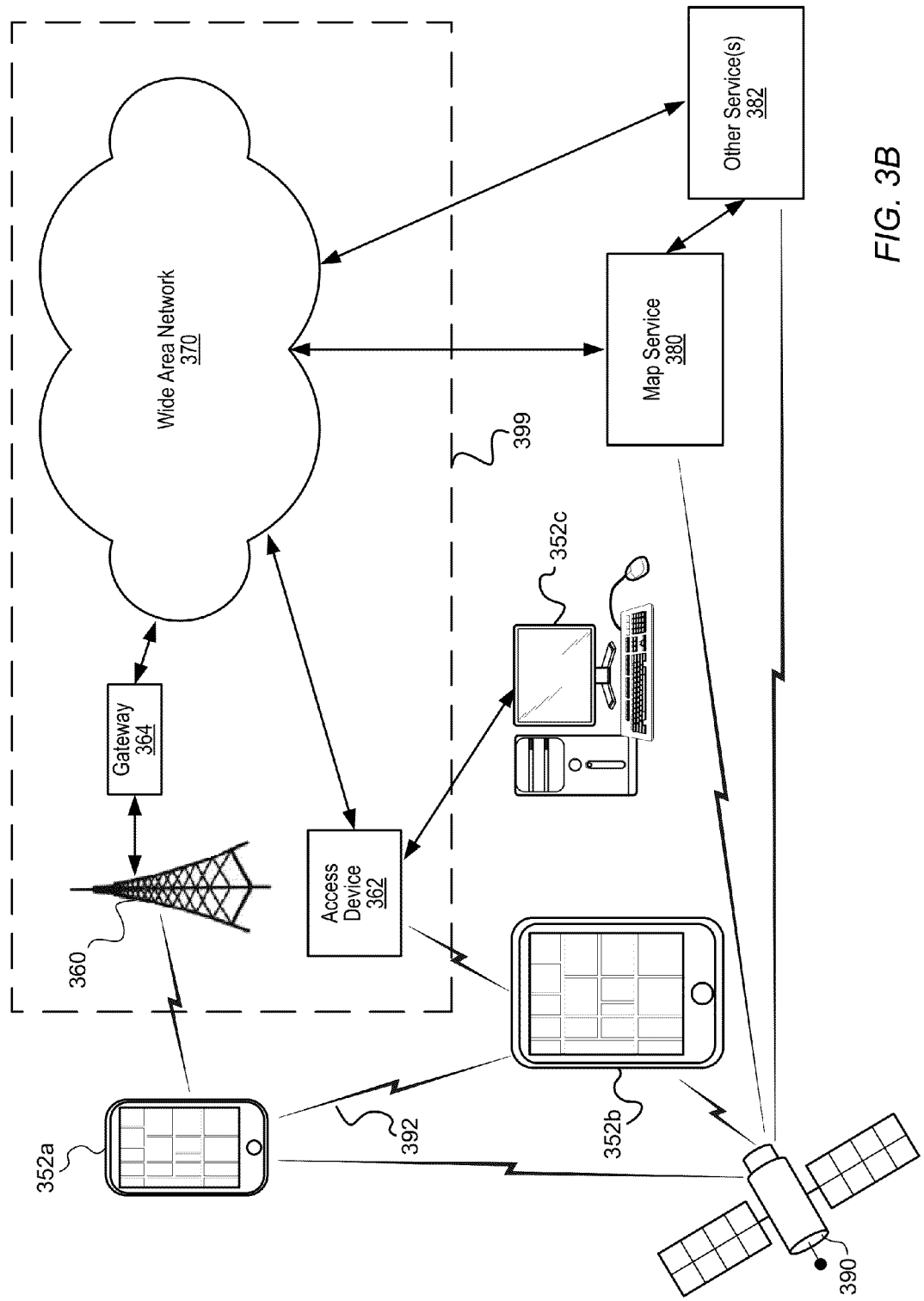
FIG. 3B depicts elements of a map service operating environment, according to some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. In some embodiments, a gesture may be detected through a camera directed at a user's hand, where the gesture is performed without contact on the screen of the mobile device.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of multiple communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
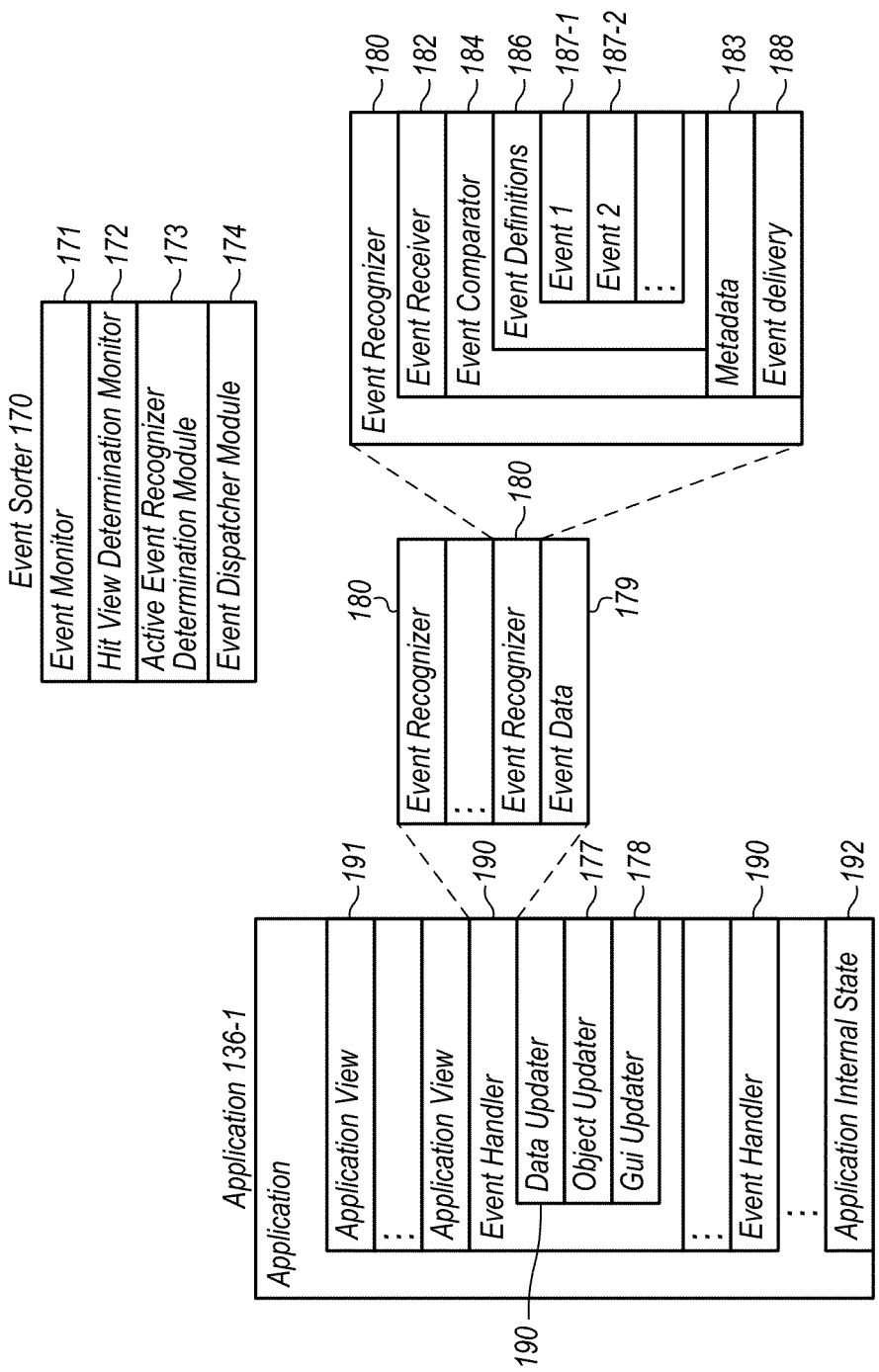
FIG. 1B is a diagram illustrating example components within a mobile device, according to some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch sensitive display 112, as part of a multi-touch gesture). Peripherals interface 118 transmits information it receives from I/O subsystem 106 or a sensor, such as proximity sensor 166, orientation sensor(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes multiple event handlers 190 and one or more application views 191, each of which includes instructions for handling touch events that occur within a respective view of the application's user interface. Each application view 191 of the application 136-1 includes one or more event recognizers 180. Typically, a respective application view 191 includes multiple event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, includes a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, includes a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate mobile devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
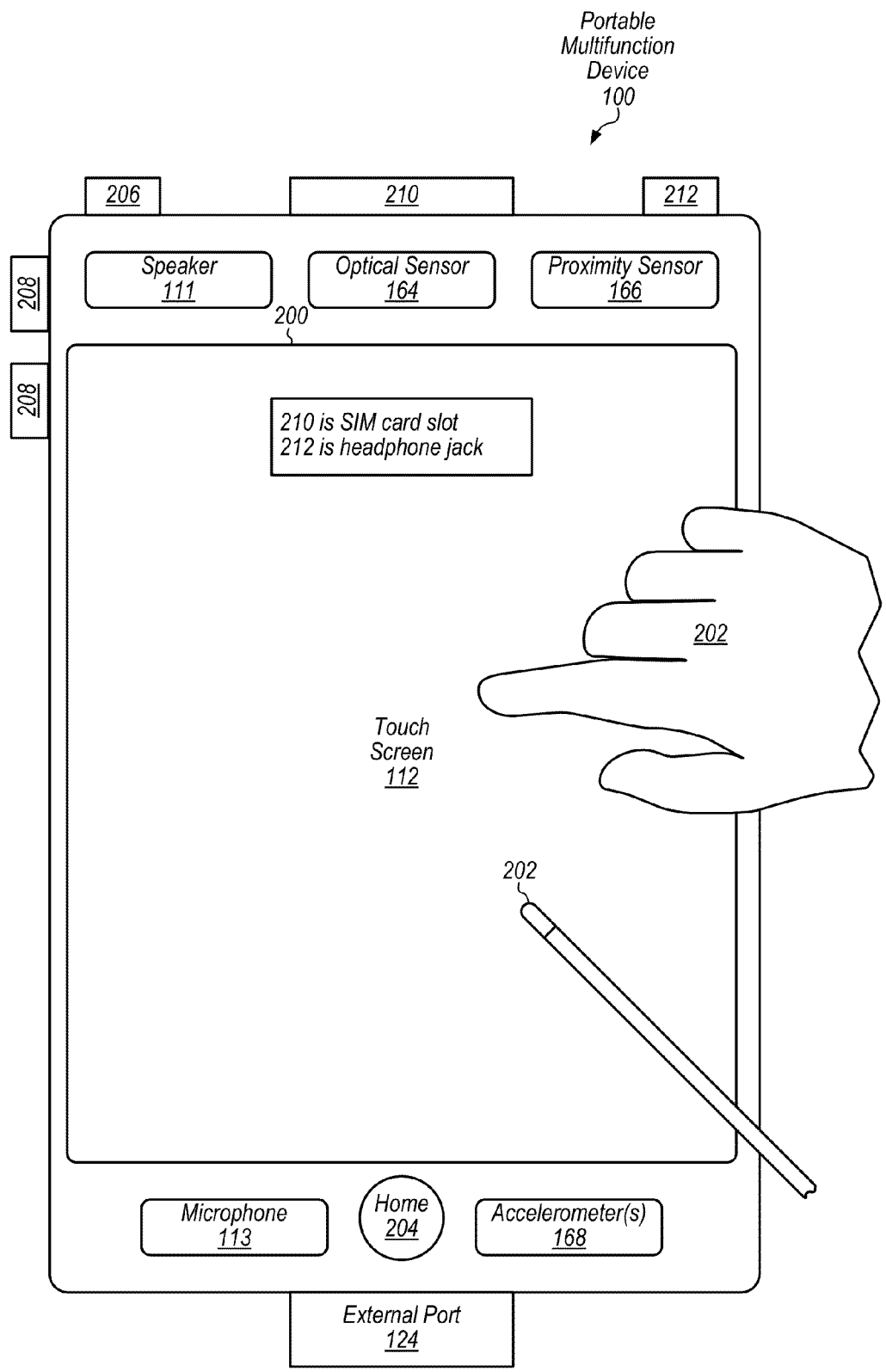
FIG. 2 illustrates a touch screen on a mobile device, according to some embodiments.

FIG. 2 illustrates a portable mobile device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to inputs on touch screen 112 (where the touch sensitive surface and the display are combined), a touch-sensitive surface that is separate from the display may be used instead of touch screen 112.

Map Service Operating Environment

Various embodiments of a map tool may operate within a map service operating environment. FIG. 3 illustrates a map service operating environment, according to some embodiments. A map service 380 may provide map services for one or more client devices 352a-352c in communication with the map service 380 through various communication methods and protocols. A map service 380 generally may provide map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 352a-352c may utilize these map services by obtaining map service data. Client devices 352a-352c may implement various techniques to process map service data. Client devices 352a-352c may then provide map services to various entities, including, but not limited to, users, internal software or hardware modules, and/or other systems or devices external to the client devices 352a-352c.

In some embodiments, a map service may be implemented by one or more nodes in a distributed computing system. Each node may be assigned one or more services or components of a map service. Some nodes may be assigned the same map service or component of a map service. A load balancing node may distribute access or requests to other nodes within a map service. In some embodiments a map service may be implemented as a single system, such as a single server. Different modules or hardware devices within a server may implement one or more of the various services provided by a map service.

A map service may provide map services by generating map service data in various formats. In some embodiments, one format of map service data may be map image data. Map image data may provide image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map may produce the original map. Tiles may be generated from map image data, routing or navigation data, or any other map service data. In some embodiments map tiles may be raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles may be vector-based map tiles, encoded using vector graphics, including, but not limited to, Scalable Vector Graphics (.svg) or a Drawing File (.drw). Embodiments may also include tiles with a combination of vector and raster data. Metadata or other information pertaining to the map tile may also be included within or along with a map tile, providing further map service data to a client device. In various embodiments, a map tile may be encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service may perform various techniques to analyze a map tile before encoding the tile for transport. This analysis may optimize map service performance for both client devices and a map service. In some embodiments map tiles may be analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile may contain certain mask values, which are associated with one or more textures. Embodiments may also analyze map tiles for specified features that may be associated with certain map styles that contain style identifiers.

Other map services may generate map service data relying upon various data formats separate from a map tile. For example, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Embodiments may format requests for a map as requests for certain map tiles. In some embodiments, requests may also supply the map service with starting locations (or current locations) and destination locations for a route calculation. A client device may also request map service rendering information, such as map textures or stylesheets. In at least some embodiments, requests may also be one of a series of requests implementing turn-by-turn navigation. Requests for other geographic data may include, but are not limited to, current location, wireless network coverage, weather, traffic information, or nearby points-of-interest.

A map service may, in some embodiments, may analyze client device requests to optimize a device or map service operation. For example, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 352a-352c) may be implemented on different device types. Examples of a portable-mobile device include the devices illustrated in FIGS. 1 through 3 and 9, such as mobile device 100 and mobile device 300. Client devices 352a-352c may utilize map service 380 through various communication methods and protocols described below. In some embodiments, client devices 352a-352c may obtain map service data from map service 380. Client devices 352a-352c may request or receive map service data. Client devices 352a-352c may then process map service data (e.g., render and/or display the data) and may send the data to another software or hardware module on the device or to an external device or system.

A client device may, according to some embodiments, implement techniques to render and/or display maps. These maps may be requested or received in various formats, such as map tiles described above. A client device may render a map in two-dimensional or three-dimensional views. Some embodiments of a client device may display a rendered map and allow a user, system, or device providing input to manipulate a virtual camera in the map, changing the map display according to the virtual camera's position, orientation, and field-of-view. Various forms and input devices may be implemented to manipulate a virtual camera. In some embodiments, touch input, through certain single or combination gestures (e.g., touch-and-hold or a swipe) may manipulate the virtual camera. Other embodiments may allow manipulation of the device's physical location to manipulate a virtual camera. For example, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Embodiments may provide various visual feedback to virtual camera manipulations, such as displaying an animation of possible virtual camera manipulations when transitioning from two-dimensional map views to three-dimensional map views. Embodiments may also allow input to select a map feature or object (e.g., a building) and highlight the object, producing a blur effect that maintains the virtual camera's perception of three-dimensional space.

In some embodiments, a client device may implement a navigation system (e.g., turn-by-turn navigation). A navigation system provides directions or route information, which may be displayed to a user. Embodiments of a client device may request directions or a route calculation from a map service. A client device may receive map image data and route data from a map service. In some embodiments, a client device may implement a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera may be implemented to manipulate navigation map data according to some embodiments. Some embodiments of client devices may allow the device to adjust the virtual camera display orientation to bias toward the route destination. Embodiments may also allow virtual camera to navigation turns simulating the inertial motion of the virtual camera.

Client devices may implement various techniques to utilize map service data from map service. Embodiments may implement some techniques to optimize rendering of two-dimensional and three-dimensional map image data. In some embodiments, a client device may locally store rendering information. For example, a client may store a stylesheet which provides rendering directions for image data containing style identifiers. In another example, common image textures may be stored to decrease the amount of map image data transferred from a map service. Client devices may also implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices may also order or prioritize map service data in certain techniques. For example, a client device may detect the motion or velocity of a virtual camera, which if exceeding certain threshold values, lower-detail image data will be loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices may communicate utilizing various data formats separate from a map tile. For example, some client devices may implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 3 illustrates one possible embodiment of an operating environment 399 for a map service 380 and client devices 352a-352c. In some embodiments, devices 352a, 352b, and 352c can communicate over one or more wire or wireless networks 360. For example, wireless network 360, such as a cellular network, can communicate with a wide area network (WAN) 370, such as the Internet, by use of gateway 364. A gateway 364 may provide a packet oriented mobile data service, such as General Packet Radio Service (GPRS), or other mobile data service allowing wireless networks to transmit data to other networks, such as wide area network 370. Likewise, access device 362 (e.g., IEEE 802.11g wireless access device) can provide communication access to WAN 370. Devices 352a and 352b can be any portable electronic or computing device capable of communicating with a map service, such as a portable mobile device described below with respect to FIGS. 1 to 3 and 9. Device 352c can be any non-portable electronic or computing device capable of communicating with a map service, such as a system described below in FIG. 3.

In some embodiments, both voice and data communications can be established over wireless network 360 and access device 362. For example, device 352a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 360, gateway 364, and WAN 370 (e.g., using Transmission Control Protocol/Internet Protocol (TCP/IP) or User Datagram Protocol (UDP)). Likewise, in some implementations, devices 352b and 352c can place and receive phone calls, send and receive e-mail messages, and retrieve electronic documents over access device 362 and WAN 370. In various embodiments, any of the illustrated client device may communicate with map service 380 and/or other service(s) 382 using a persistent connection established in accordance with one or more security protocols, such as the Secure Sockets Layer (SSL) protocol or the Transport Layer Security (TLS) protocol.

Devices 352a and 352b can also establish communications by other means. For example, wireless device 352a can communicate with other wireless devices (e.g., other devices 352a or 352b, cell phones) over the wireless network 360. Likewise devices 352a and 352b can establish peer-to-peer communications 392 (e.g., a personal area network) by use of one or more communication subsystems, such as Bluetooth® communication from Bluetooth Special Interest Group, Inc. of Kirkland, Wash. 352c can also establish peer to peer communications with devices 352a or 352b. (not pictured). Other communication protocols and topologies can also be implemented. Devices 352a and 352b may also receive Global Positioning Satellite (GPS) signals from GPS 390.

Devices 352a, 352b, and 352c can communicate with map service 380 over the one or more wire and/or wireless networks, 360 or 362. For example, map service 380 can provide a map service data to rendering devices 352a, 352b, and 352c. Map service 380 may also communicate with other services 382 to obtain data to implement map services. Map service 380 and other services 382 may also receive GPS signals from GPS 390.

In various embodiments, map service 380 and/or other service(s) 382 may be configured to process search requests from any of client devices. Search requests may include but are not limited to queries for business, address, residential locations, points of interest, or some combination thereof. Map service 380 and/or other service(s) 382 may be configured to return results related to a variety of parameters including but not limited to a location entered into an address bar or other text entry field (including abbreviations and/or other shorthand notation), a current map view (e.g., user may be viewing one location on the mobile device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 380 and/or other service(s) 382 may be configured to provide auto-complete search results that may be displayed on the client device, such as within the mapping application. For instance, auto-complete search results may populate a portion of the screen as the user enters one or more search keywords on the mobile device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the internet) by map service 380 and/or other service(s) 382, and/or some combination thereof. As is the case with commands, any of the search queries may be entered by the user via voice or through typing. The mobile device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the mobile device may be configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 380 and/or other service(s) 382 may provide one or more feedback mechanisms to receive feedback from client devices 352*a*-*c*. For instance, client devices may provide feedback on search results to map service 380 and/or other service(s) 382 (e.g., feedback specifying ratings, reviews, temporary or permanent business closures, errors etc.); this feedback may be used to update information about points of interest in order to provide more accurate or more up-to-date search results in the future. In some embodiments, map service 380 and/or other service(s) 382 may provide testing information to the client device (e.g., an A/B test) to determine which search results are best. For instance, at random intervals, the client device may receive and present two search results to a user and allow the user to indicate the best result. The client device may report the test results to map service 380 and/or other service(s) 382 to improve future search results based on the chosen testing technique, such as an A/B test technique in which a baseline control sample is compared to a variety of single-variable test samples in order to improve results.

Example Mapping Functionality

FIG. 3 illustrates another example of a mobile device that may implement a map tool in accord with the embodiments described, where the mobile device may be configured in a manner similar to the mobile device described above. In the illustrated embodiment, a mobile device 300 includes a mapping application (e.g., map module 154 described above) that may be stored in one or more memories of mobile device 300 and executed on one or more processors of mobile device 300. As is the case for the mobile device described above, mobile device 300 may include one or more controls 302 for operating the mobile device. These controls may include but are not limited to power controls for turning the device on and off, volume controls for adjusting the ear piece volume or the speaker volume, menu controls for navigation functions of the device, and function controls for initiating one or more function or actions on the device. Controls 302 may include hardware controls or software controls. For instance, the bottom left corner of electronic display 312 includes a graphical representation of a control 312 that may be selected by a user, such as by way of touch in accordance with the touch screen functionality described above.

Mobile device 300 may also include other components similar to those described above, such as a microphone 304, an earpiece 306 (e.g., a speaker through which to convey audio representations of telephone calls), an optical sensor 308, and/or a speaker 310. Each of these components may be configured in a similar manner to those like-named components of FIG. 2 described above. Furthermore, electronic display 312 may be configured with touch screen capability, such as touch screen 112 described above. In various embodiments, controls (e.g., on screen control(s) 302) may be utilized to perform any of a variety of map-related functions including but not limited to zoom in, zoom out, rotate screen, pan screen, toggle views (e.g., two-dimensions to three dimensions and vice versa), and/or another map related activity. In various embodiments, one or more gestures may be utilized to perform any of the aforesaid map controls (with or without the use of an actual graphical on-screen control). In one non-limiting example, a one figure gesture may be utilized to adjust the pitch within a three-dimensional map view.

As noted above, mobile device 300 includes a mapping application that may be stored in one or more memories of mobile device 300 and executed on one or more processors of mobile device 300. In the illustrated embodiment, the graphical representation of the mapping application may include a map 314 of a geographic region. This map may be presented as a two-dimensional map or a three-dimensional map, the selection of which may be specified through, e.g., a user-configurable parameter of the mapping application. In some embodiments, the mobile device may toggle between two-dimensional map or three-dimensional map views responsive to input from any input component of the mobile device. In one non-limiting example, input from orientation sensor(s) 168 may initiate the transition from a two-dimensional map view to a three-dimensional map, and vice versa. For instance, one or more of orientation sensor(s) 168 may detect a tilt (e.g., a user-initiated tilt) in the orientation of the mobile device and, in response, initiate the aforesaid toggling.

Map 314 may include a graphical position indicator 316, which may represent the location of the mobile device within the geographic region of the map. Generally position indicator 316 may represent the current or real-time position of the mobile device, although it should be understood that in some cases there may exist some small amount of temporal latency between the actual position of the mobile device and the graphical representation of that location (e.g., position indicator 316). This may occur, e.g., when the mobile device is in motion. In various embodiments, the mobile device may be configured to perform map matching including but not limited to aligning a sequence of observed user positions with a road network on a digital map. In various embodiments, the mobile device may be configured to perform a "snap to" function in which the graphical position indicator 316 is aligned onto a roadway when the user's position falls within in a specified threshold distance of the roadway.

Furthermore, mobile device 300 may generally be operated by a user. For example, mobile device 300 may in some cases be a smartphone utilized by an individual to make phone calls, send text messages, browse the internet, etc. As use of mobile device by an individual generally implies the individual is proximate to the mobile device (e.g., the user may be holding the device in his or her hand), references herein to the location of the device and the location of the user may be considered to be synonymous. However, it should be understood that in some cases the actual position of the mobile device and the user of that device may differ by some distance. For instance, the user may place his or her mobile device on a table of an outdoor café while sitting in a nearby chair. In this case, the position of the device and the position of the user may differ by some small amount. In another example, mobile device 300 may be mounted on a car dashboard (e.g., for use as a navigation device) while the user of the device sits nearby (e.g., in the driver seat of the car). In this case as well, the position of the device and the position of the user may differ by some small amount. Despite these small differences in position, generally the position of the mobile device and the position of the mobile device user may be considered to coincide.

In various embodiments, the map 314 displayed by the mobile device may include one or more roads (e.g., roads 318*a-b*), buildings (not illustrated), terrain features (e.g., hills, mountains) (not illustrated), parks (not illustrated), water bodies (not illustrated), and/or any other item that may be conveyed by a map. In some cases, the map may also include other map or navigation information including but limited to readouts from one or more of a directional compass, an altimeter, and/or a thermometer.

In various embodiments, the mapping application may be configured to generate directions from an origination (e.g., an address or a user's current position) to a destination (e.g., an address, landmark, bookmarked/saved location, or point of interest). For instance, an indication of the origination and/or destination may be input into the multi function device by the user. The mobile device may generate one or more candidate routes between those two points. The mobile device may select one of those routes for display on the device. In other cases, multiple candidate routes may be presented to the user and the user may select a preferred route. In the illustrated embodiment, one route is illustrated as route 320. The route may also include turn-by-turn directions which may be presented to the user (in 2D or 3D), such as a graphical indication to perform a turn 322*a* from road 318*a* to road 318*b*. In some embodiments, this graphical indication to perform a turn may be supplemented or substituted with an audible indication to turn, such as a voice command from speaker 310 that indicates the user is to "turn left in 100 yards," for example. In some embodiments, the route that is selected may be presented to the user as a route overview. For instance, before proceeding with navigation, the mobile device may generate a route overview display that graphically indicates key information for the route, such as key turns, route distance and/or an estimated time for traversing the route. In some cases, the mobile device may be configured to generate a display of driving maneuvers (e.g., turns, lane changes, etc.) that occur in quick succession, either in the route overview or during actual navigation. This information may help the user safely prepare for such maneuvers. In some cases, the route information may be presented in a list format, such as a list of turns or other maneuvers.

In various embodiments, the mapping application of the mobile device may be configured to track the position of the user over time and correspondingly adjust the graphical position indicator 316 to indicate the new position. For instance, the mapping application may determine that the user is traveling along route 320 from position information (e.g., information from GPS module 135) and update the map 314 accordingly. For instance, in some cases the map 314 may remain stationary while position indicator 316 is moved along the route. In other cases, position indicator 316 may remain stationary or "fixed" while map 314 is moved (e.g., panned, turned, etc.) around the position indicator.

In various embodiments, the mobile device may be configured to display alternate or contingency routes. In some cases, these routes may be selectable by the user (e.g., via the touch screen interface). In other cases, the mobile device may select a best route based on one or more parameters, such as shortest distance or time. In some cases, these parameters or preferences may be set by the user.

As described in more detail below, the mobile device may in various embodiments receive routing information that specifies a route from a map service. In some case, the mobile device may carry out navigation guidance in accordance with this route. However, in some cases, the mobile device may perform a reroute operation in order to generate a new route to the destination. For instance, the user may have deviated from the original route or explicitly requested a new route. In some cases, the mobile device may perform rerouting based on cached map data stored on the mobile device.

In various embodiments, the mobile device may be configured to perform route correction based on real-time data, such as updates in map information, road conditions, traffic conditions, and/or weather conditions. For instance, the mobile device may be configured to alter a route such that the route avoids a construction zone or a dangerous storm cell.

In various embodiments, the mobile device may be configured to perform lane guidance independently or as part of navigation guidance. For instance, the mobile device may, in response to detecting that multiple turns follow in quick succession, provide the user with a direction or suggestion as to which lane to occupy. For instance, a voice or visual indication may specify that the user "turn right, then move to the left lane" in anticipation of a subsequent left turn. In another example, the mobile device may detect one or more lane closures (e.g., due to construction or other reasons) and instruct the user to avoid such lanes.

In various embodiments, the mobile device may be configured to generate voice prompts for directions. For instance, during navigation guidance, the mobile device may be configured to generate audio representations of the next turn or driving maneuver on the route. For instance, the mobile device may be configured to audibly indicate the user should "turn left in 100 yards" or some other audible indication of a maneuver.

In various embodiments, the mobile device may be responsive to various voice commands for performing actions including a command to obtain a route. For instance, the mobile device may interpret the user's voice through a microphone or other transducer of the mobile device. The user may specify an origination and a destination for the requested route. In various embodiments, the mobile device may be configured to utilize the user's current location as the origination for the route.

In various embodiments, the mobile device may be configured to perform a search along a specific route, such as current navigation route. For instance, the user of the mobile device may request the location of points of interest, such as fuel stations or restaurants. However, if a user is traveling along a particular route, they may not be particularly interested in points of interest that are not proximate to that route. As such, the mobile device may be configured to scope any searches to points of interested within a specified distance away from the route. In various embodiments, this distance may be a configurable parameter.

In various embodiments, the mobile device may be configured to display various graphical layers including but not limited to a graphical map information, aerial images (e.g., satellite-acquired images), and/or traffic information. For instance, in the traffic information example, the mobile device may overlay color coded traffic information on roadways to indicate the speed at which traffic is flowing. For example, green color coding may be used to indicate traffic is flowing normally, and yellow or red may be used to indicate traffic slowdowns.

In various embodiments, the mobile device may be configured to display any quantity of metrics or statistics about a navigation route including but not limited to an estimated time of arrival, travel distance remaining, average speed (overall or moving average), top speed, and/or other route statistics.

In various embodiments, the mobile device may be configured to display routes at different angles in order to accommodate the preferences of different users. Such viewing angles may include a birds eye view for two-dimensional maps to any of a variety of camera angles available for a three-dimensional map.

In various embodiments, the mobile device may be configured to provide navigation information other than map and routing information. For instance the mobile device may expose output from any of the hardware device described above with respect to FIG. 1. In one non-limiting example, an orientation sensor 168 may include a compass that outputs direction data. The mobile device described herein may be configured to display this directional data as a virtual compass, for example.

Example Ranking Tool

Figure 4A:
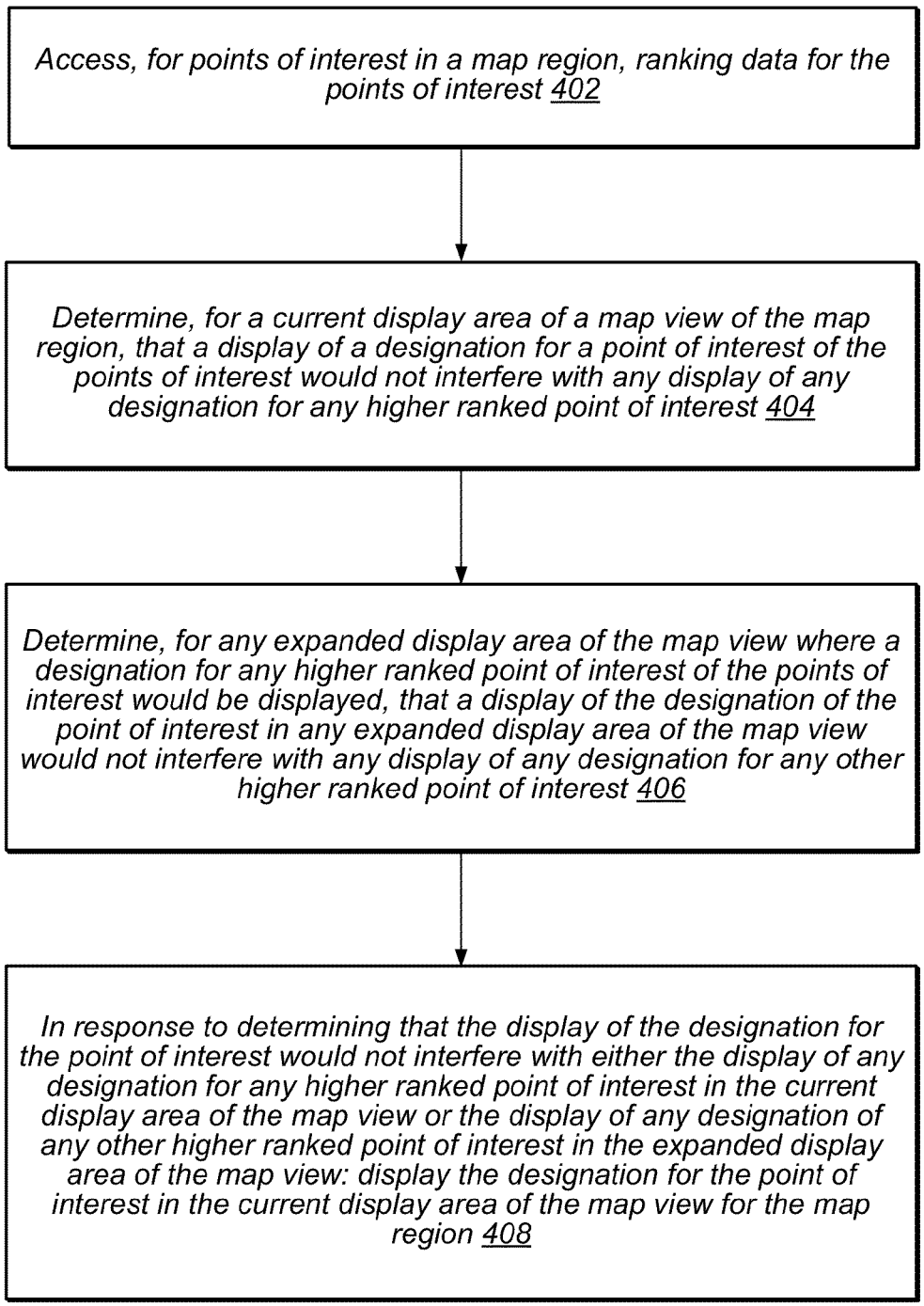
FIGS. 4A-4F depict example flowcharts corresponding to different embodiments of a map tool, according to some embodiments.
Figure 4B:
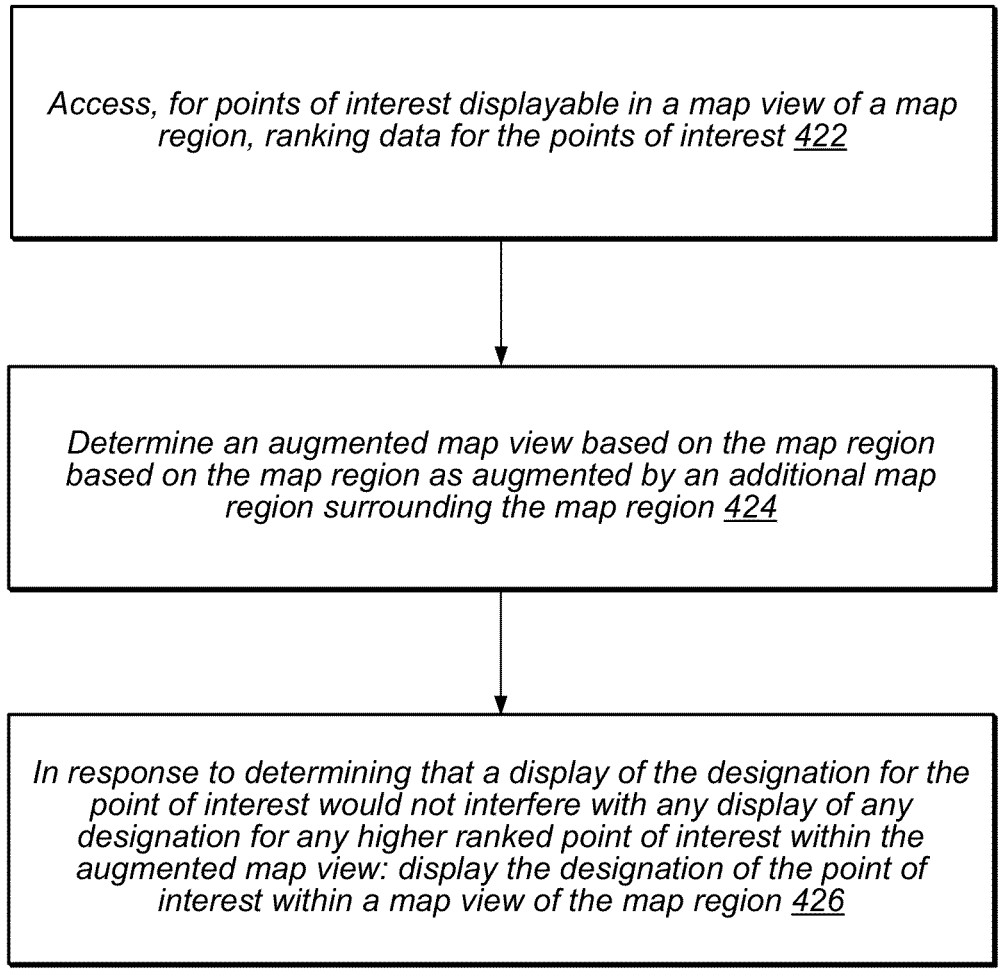
Figure 4C:
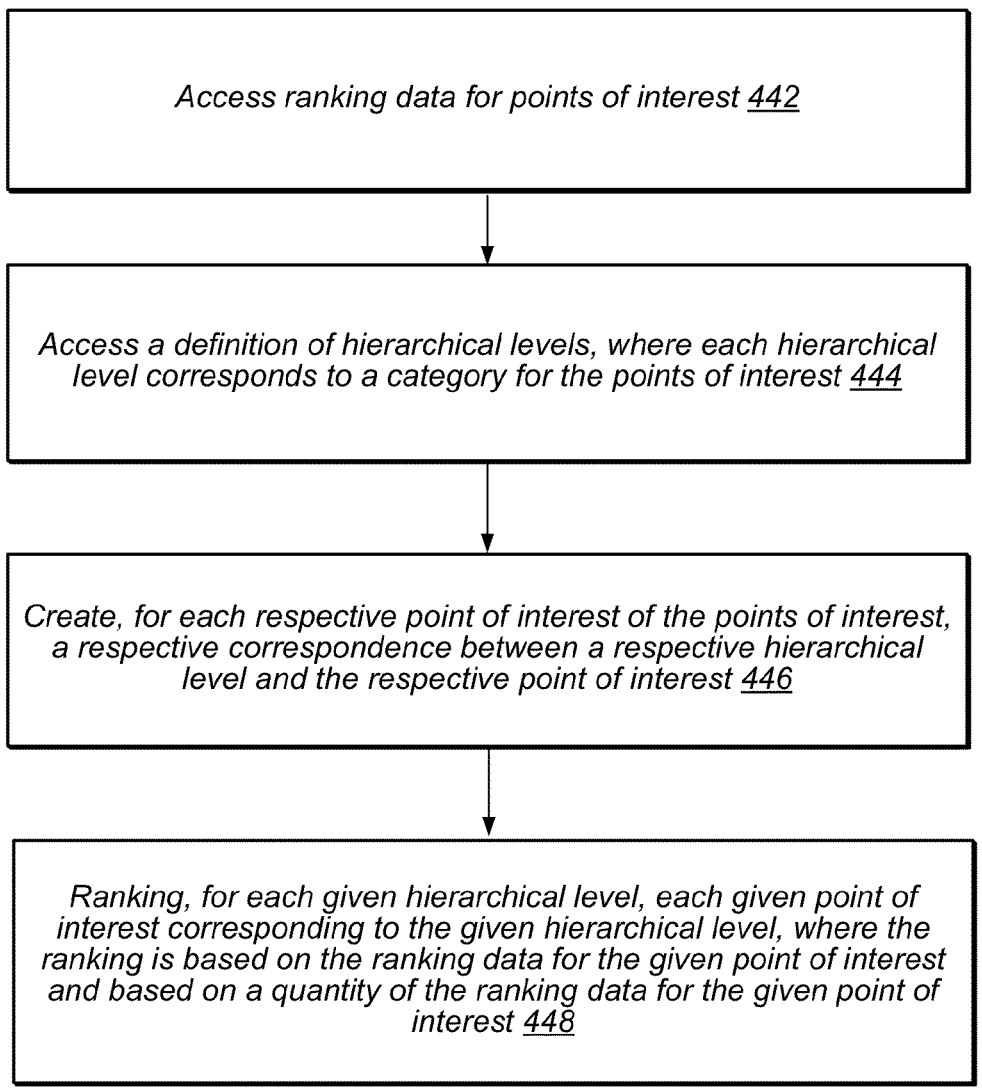

FIG. 4C is a flowchart depicting selected processing stages of an embodiment of a ranking tool operable on a mobile device 300 or on a server such as map services 380 or other services 382. As discussed above, the ranking tool may use and access other ranking data as a basis for ranking of points of interest. The accessing of ranking data for points of interest is reflected in stage 442.

For example, there are several social networking related sources for ranking information for points of interest such as rest stops, restaurants, restrooms, historical attractions, historical markers, hotels, among ranking information for nearly any other commercial service or public service. In other words, if an element in a map region may be displayed in a map view of the map region, then there is a possibility that information related to the quality or character of the element has been submitted and stored in a database. In other examples, the ranking information may be aggregated from multiple sources. In other examples, the ranking information may be collected, for example by Map Services 380, from crowdsourced information.

The ranking tool may also access one or more definitions of hierarchal levels used to categorize points of interest within a map region, as reflected in stage 444. In some cases, the hierarchical levels may be defined prior to use of the ranking data, and in other cases, a user may select from a displayed set of categories, which categories should be used in selecting points of interest. For example, FIG. 7 depicts several different categories that correspond to a hierarchical level, and in some cases, a user may select to see points of interest in a map that correspond to two different categories, category 706 and category 708, where the hierarchy organization for these two categories may be determined according to a priority assigned or selected by a user through a configuration settings interface.

Given the ranking data for points of interest and given the definition of hierarchical levels for categorizing the points of interest, the ranking tool may create, for each respective point of interest of the points of interest, a respective correspondence between a respective hierarchical level and the respective point of interest, as reflected in stage 446.

The ranking tool may then, for each given hierarchical level, rank each given point of interest corresponding to the given hierarchical level, where the ranking is based on the ranking data for the given point of interest and based on a quantity of the ranking data for the given point of interest, as reflected in stage 448. In different embodiments, a respective weight may be attached to the ranking data and to the quantity of the ranking data in order to emphasize either positive or negative ranking data or to emphasize the popularity or notoriety of a point of interest, whether or not the ranking data for the point of interest is particularly good.

Example Map Tool

FIGS. 4A, 4B, 4D, and 4E are flowcharts depicting selected processing stages of embodiments of a map tool operable on a mobile device 300, operable on a desktop computer, or operable on a server, such as map services 380 or other services 382. As discussed above, the map tool may be invoked through the a user selecting the mapping application through the interface of a mobile device 300 or through a content browser operating on a desktop computer.

As per FIG. 4A, in some embodiments, a map tool, may access, for points of interest in a map region, ranking data for the points of interest, as reflected in stage 402. The map region may be determined in any of a variety of different ways. For example, a user may enter an address or the name of a city or state, or the user nay enter a destination address to enter a navigation mode.

For a given or determined map region, the map tool may generate a map view of the map region. The map view may be based on vector data and the map view may be either two-dimensional or three-dimensional. While the perspective of the map view may affect how many labels or designations may be displayed, the process for determining which designations to display is the same.

When the user invokes a mapping application, the map tool may display a current display area of a map view that corresponds to a map region at a default zoom level, or resume from a previous zoom level, or the map tool may determine the zoom level based on a search query. For example, if a user searches for "Grand Canyon", the map view may be set to a zoom level that would allow for a significant portion of the Grand Canyon to be visible. Similarly if a user searches for a restaurant, or a type of restaurant.

The map tool may determine, for the current display area of a map view of the map region, that a display of a designation for a point of interest from among possibly multiple points of interest within the same hierarchical level would not interfere with a display of any designation for any higher ranked point of interest in the current display area of the map view, as reflected in stage 404.

The map tool may also determine, for any expanded display area of the map view in which a designation for any another, higher ranked point of interest would be displayed, that a display of any corresponding designation of the point of interest would not interfere with any display of any designation for any other higher ranked point of interest, as reflected in stage 406.

In response to determining that the display of the designation for the point of interest would not interfere with either the display of any designation for any higher ranked point of interest in the current display area of the map view or the display of any designation of any other higher ranked point of interest in the expanded display area of the map view, the map tool may display the designation for the point of interest in the current display area of the map view for the map region, as reflected in stage 408.

As per FIG. 4B, in some embodiments, the map tool may access, for designations of points of interest displayable in a map region, ranking data for the points of interest, as reflected in stage 422.

The map tool may then determine an augmented map view based on the map region as augmented by an additional map region surrounding the map region, as reflected in stage 424. For example, for map view 602 in FIG. 6, the augmented map view may include the region for the map view 602 in addition to the surrounding map view region corresponding to map view 604. While only map view 602 would be visible within a display of the mapping application, the map region used by the map tool to determine which designations to display would correspond to the larger map region for map view 604.

In response to determining that a display of the designation for the point of interest would not interfere with any display of any designation for any higher ranked point of interest within the augmented map view, the map tool may display the designation of the point of interest within the map view of the map region, as reflected in stage 426.

If on the contrary, for example, designation 606 corresponded to a lower ranking point of interest and designation 608 corresponded to a higher ranked point of interest, then designation 606 would not be displayed because it would interfere with the display of designation 608 because both designations 606 and 608 would be considered by the map tool because they are encompassed by expanded map view 604.

In other words, in this embodiment, before a lower ranked point of interest designation is displayed, the map tool determines that there is no interference between the lower ranked point of interest designation and any higher ranked point of interest designations within the map region as augmented by a surrounding map region. In some cases, the size of the buffer area or surrounding map region may be based on the largest expected size of a display of a designation for a point of interest. However, the buffer area around the map region for a map view may be smaller or larger or based on other factors.

Figure 4D:
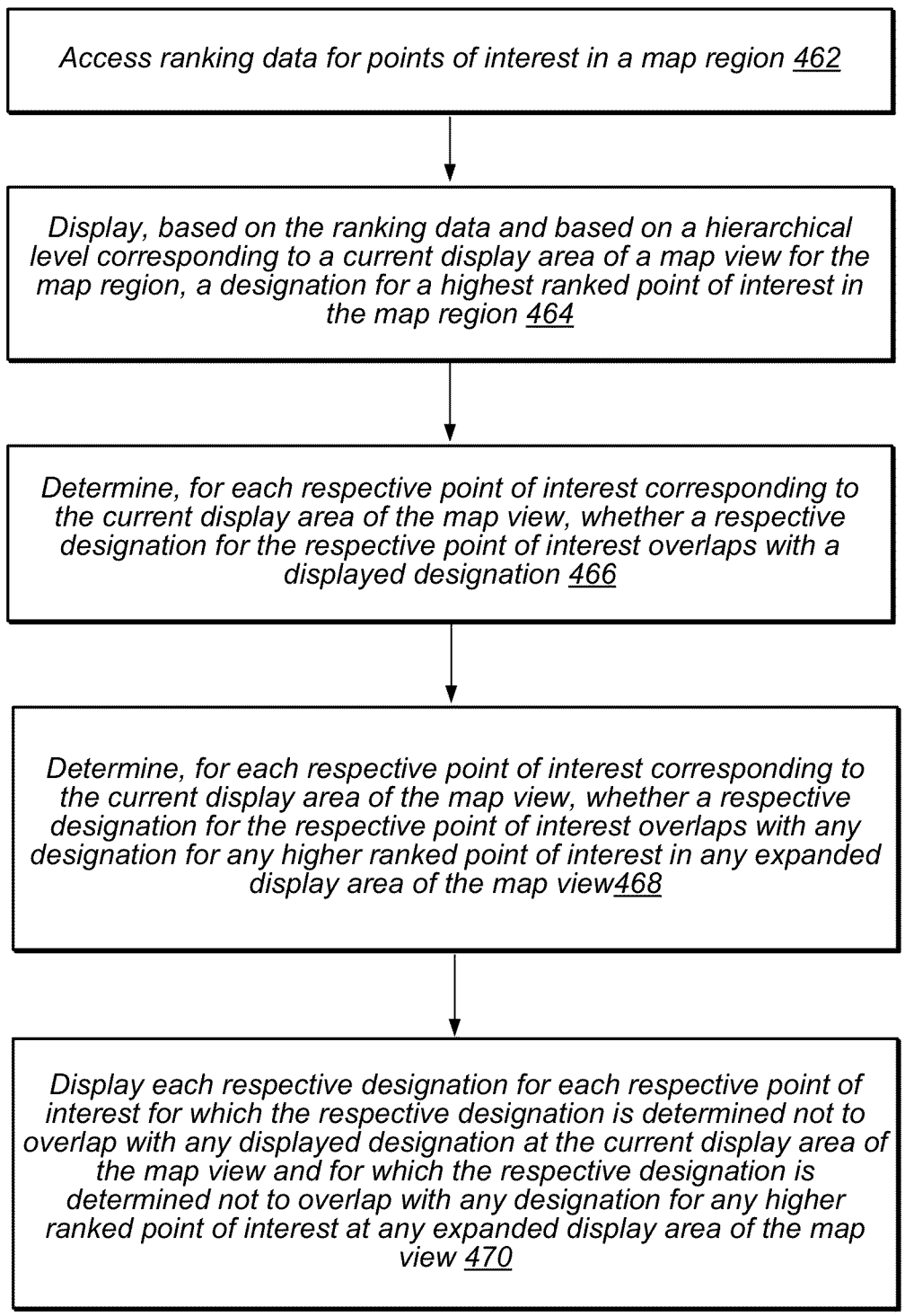

As per FIG. 4D, in some embodiments, the map tool may access ranking data for points of interest in a map region, as reflected in stage 462. Based on the ranking data and based on a hierarchical level corresponding to a current display area of the map view for the map region, the map tool may display in the map view a designation for a highest ranked point of interest in the map region, as reflected in stage 464.

Once the designation for the highest ranked point of interest has been displayed in the current display area of the map view, the map tool may determine, for each respective point of interest corresponding to the current display area of the map view, whether a respective designation for the respective point of interest overlaps with a displayed designation, as reflected in stage 466.

The map tool may then, for each respective point of interest corresponding to the current display area for the map view, determine whether a respective designation for the respective point of interest overlaps with any designation for any higher ranked point of interest in any expanded display area of the map view, as reflected in stage 468.

As this point, the map tool may display each respective designation for each respective point of interest for which the respective designation is determined not to overlap with any displayed designation at the current zoom level and for which the respective designation is determined not to overlap with any designation for any higher ranked point of interest at any expanded display area of the map view, as reflected in stage 470.

Figure 4E:
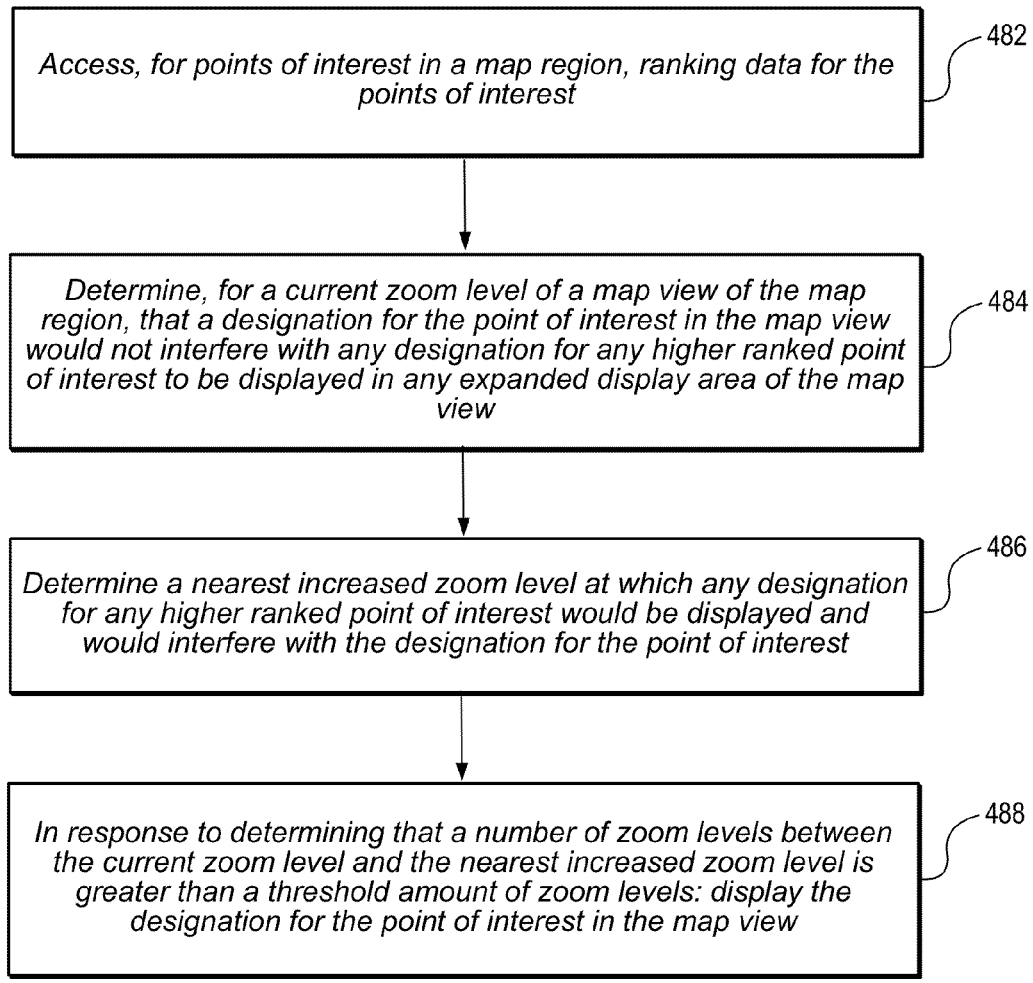

As per FIG. 4E, in some embodiments, a map tool may access, for points of interest in a map region, ranking data for the points of interest, as reflected in stage 482. For a current zoom level of a map view of the map region, the map tool may determine that a designation for the point of interest in the map view would not interfere with any designation for any higher ranked point of interest to be displayed in any expanded display area of the map view, as reflected in stage 484.

The map tool may then determine a nearest increased zoom level at which a display of any designation for any higher ranked point of interest would be displayed and whose display would interfere with the display of the designation for the point of interest, as reflected in stage 486.

In previous embodiments, if the designation of any higher ranked of interest at a map view for any subsequent zoom level interfered with the designation of the lower ranked point of interest at the current zoom level, the designation for the lower ranked point of interest would not be displayed. However, in this example, instead of effectively reserving space in the map view for higher ranked designations for points of interest that are to be displayed later, the map tool may present more information earlier even if the result is not displaying designations for higher ranked points of interest because lower ranked points of interest have already been displayed and the map tool avoids removing designations that have already been displayed at earlier zoom levels.

As reflected in stage 488, in response to determining that a number of zoom levels between the current zoom level and the nearest increased zoom level is greater than a threshold amount of zoom levels, the map tool may display the designation for the point of interest in the map view. In this way, if the higher ranked point of interest is not displayable for more than the threshold amount of zoom levels from the current zoom level, then the map tool displays the designation for the lower ranked point of interest. The number of zoom levels down for a higher ranked point of interest at which the higher ranked point of interest loses out to the lower ranked point of interest may be adjustable.

Figure 4F:
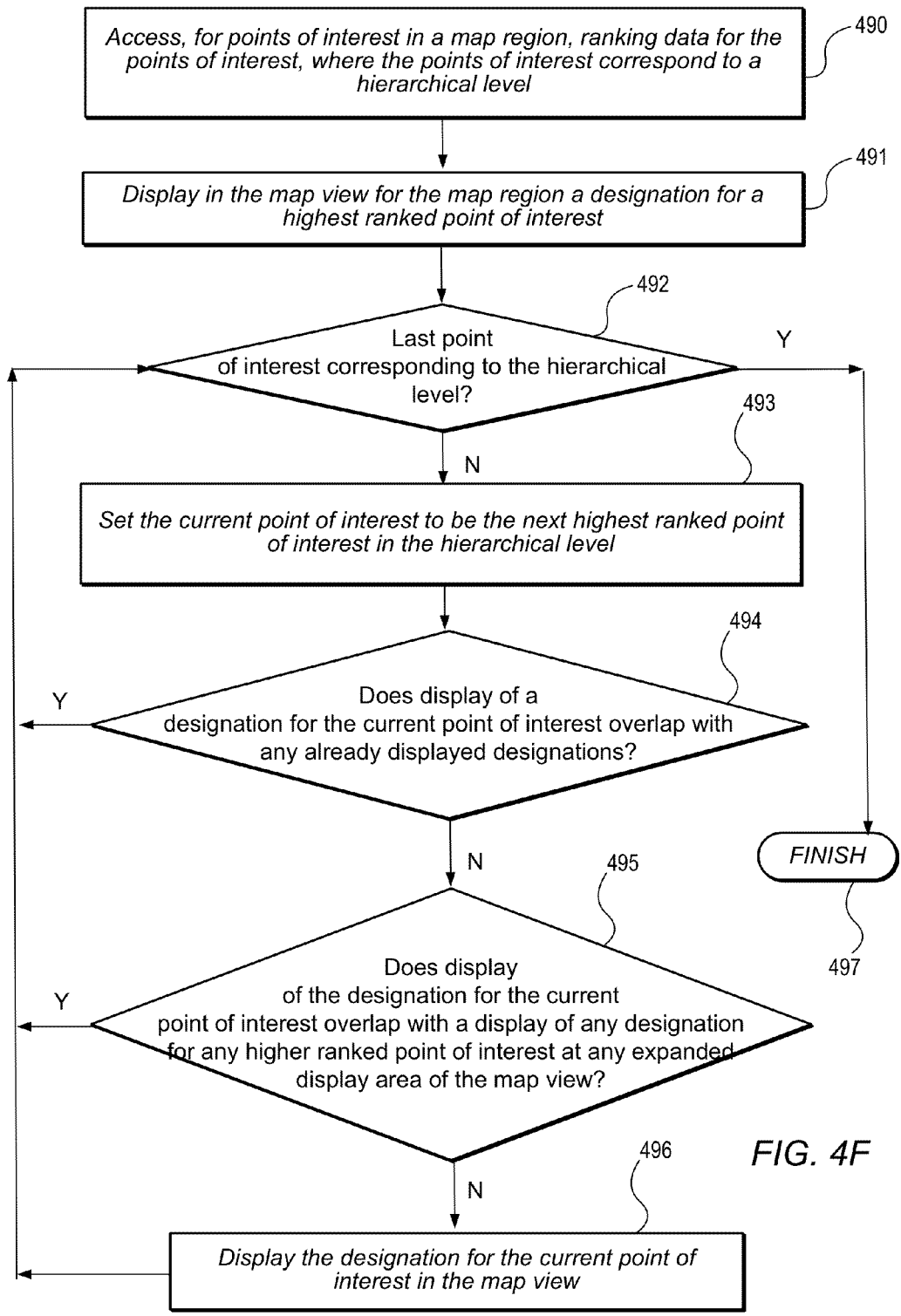

As per FIG. 4F, in some embodiments, the map tool may access, for points of interest in a map region, ranking data for the points of interest, where the points of interest correspond to a hierarchical level, as reflected in stage 490. At this point, in this example, the map tool may display, based on the ranking data, the first designation in the map view for the highest ranked point of interest in a given hierarchical level of a plurality of hierarchical levels, and where there may be a plurality of points of interest classified similarly to the highest ranked point of interest, as reflected in stage 491.

If the highest ranked point of interest were the only point of interest at the hierarchical level, then at stage 492, control would continue to stage 497, a stopping point for determining designations to display. If there are other points of interest at the current hierarchical level, then control continues at stage 493, where the map tool sets the current point of interest to be the next highest ranked point of interest in the hierarchical level. In some embodiments, at stage 492, instead of stopping after reaching the last point of interest, the map tool may stop after a particular number of designations have been displayed. For example, in some cases, after 15 designations have been displayed, the map tool may stop displaying further designations to avoid cluttering the map view even if additional designations may be displayable.

At stage 494, the map tool determines if the display of the designation for the current point of interest overlaps with any already displayed designation. If an overlap exists, then the current point of interest designation is not displayed and control passes to stage 492 in order to consider the next point of interest in the hierarchical level.

If display of the designation for the current point of interest does not overlap with any currently displayed designations, then control passes to stage 495 where another determination is made. At stage 495, the map tool determines whether display of the designation for the current point of interest overlaps with a display of any designation for any higher ranked point of interest in any expanded display area of the map view.

If display of the designation for the current point of interest overlaps with a display of any designation for a higher ranked point of interest at the current display area of the map view where a higher ranked point of interest would be displayed, then the designation for the current point of interest is not displayed and control passes to stage 492 in order to consider the next point of interest in the hierarchical level.

If display of the designation for the current point of interest does not overlap with a display of a designation for a higher ranked point of interest at the current display area of the map view where a higher ranked point of interest would be displayed, then the designation for the current point of interest is displayed in the current display area for the map view, as reflected in stage 496. After display of the designation for the current point of interest in stage 496, control passes to stage 492 in order to consider the next point of interest in the hierarchical level.

When all points of interest at the given hierarchical level have been considered or when a specific number of points of interest have been considered, the map tool would have displayed each displayable designation for points of interest at the given hierarchical level. In some embodiments, for a given map view zoom level, more than one hierarchical level may be displayable, and in such a case, a similar process as was described for the one hierarchical level may be performed for any other hierarchical level.

Ranking Tool Module

Figure 8A:
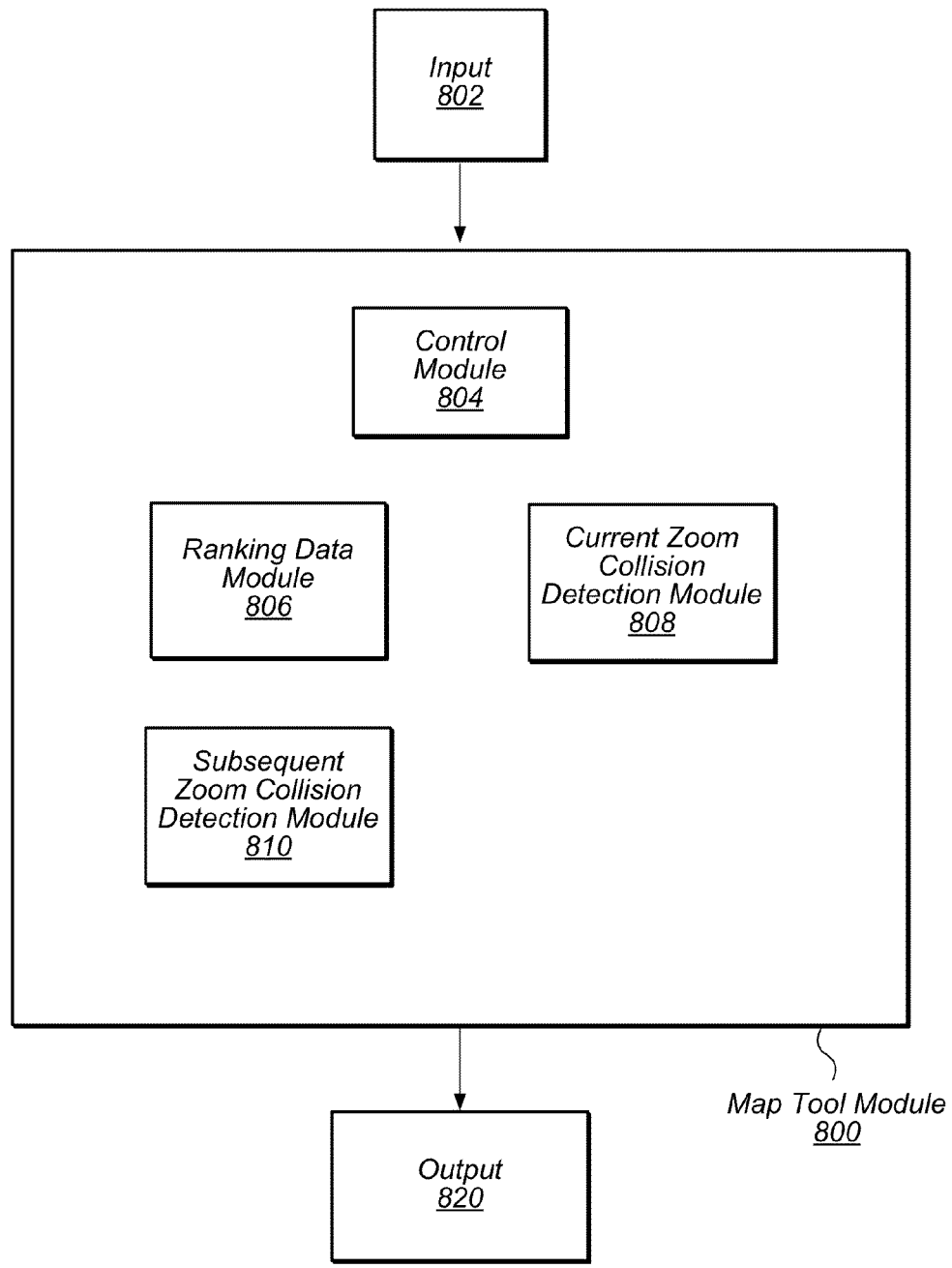
FIG. 8A illustrates a map tool module, according to some embodiments.
Figure 8B:
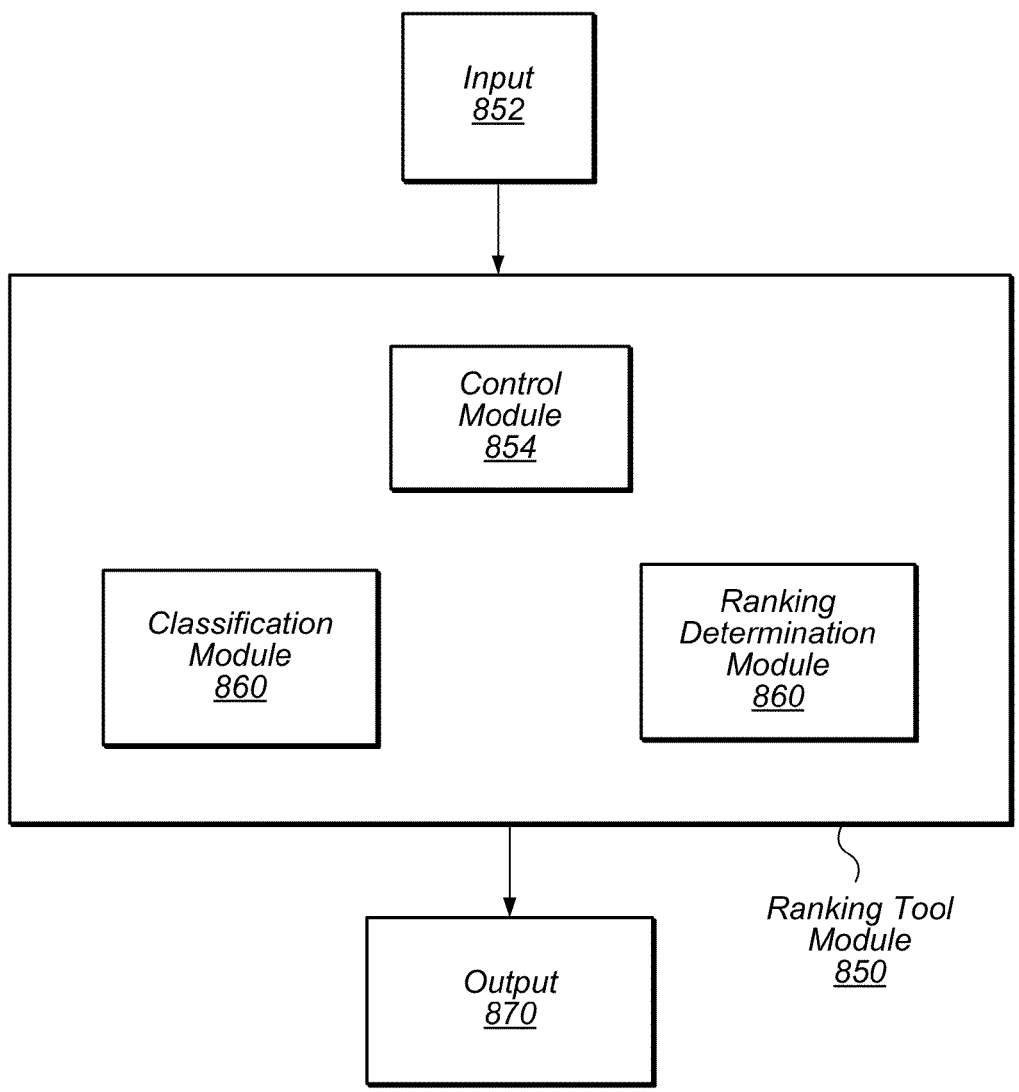
FIG. 8B illustrates a ranking tool module, according to some embodiments.

FIG. 8B illustrates an embodiment of Ranking Tool Module 850. The Ranking Tool Module 800 may implement each of the different embodiments of a ranking tool.

In some embodiments, Control Module 854 may receive Input 852, which may be various types of ranking data as described above or Input 82 may be a set of hierarchical levels along with respective metadata corresponding to each respective hierarchical level, where the metadata may be used to classify points of interest into an appropriate hierarchical level.

Given ranking data, Control Module 854 may invoke Classification Module 806 to use the ranking data and hierarchical levels to classify a given point of interest as corresponding to a given hierarchical level.

Based on elements of the ranking data, Ranking Determination Module 860 may determine the respective rankings of each of the points of interest within each classification, or within each hierarchical level.

The hierarchically organized ranking data for each point of interest may then be provided as output 870.

Map Tool Module

FIG. 8A illustrates an embodiment of a Map Tool Module 800. Map Tool Module 800 may implement each of the different embodiments of a map tool.

In some embodiments, Control Module 804 may receive Input 802, which may be various types of ranking data, as described above with respect to FIGS. 4A-4E, or Input 802. Given the ranking data, Control Module 804 may invoke Ranking Data Module to identify successively ranked points of interest.

Current Zoom Collision Detection Module 808 may determine when a display for a designation for one point of interest would interfere, overlap, or collide with a display for a designation for another, different point of interest.

Subsequent Zoom Collision Detection Module 810 may determine when a display for a designation for one point of interest in a corresponding map view would interfere, overlap, or collide with a display for a designation for another, different point of interest as it would be displayed in a corresponding map view.

Depending on the embodiment and current state, Control Module 804 may provide a display of a map view as Output 820.

Rendering a Map View

With regard to a mobile device such as mobile device 300, a map tool on the mobile device may display a three-dimensional view of a map, where the map tool bases the three-dimensional view on a three-dimensional model constructed from one or more data sets with mapping information corresponding to the map. The constructed three-dimensional model may include representations for buildings in the map region.

In some cases, for the embodiment where the map tool generates a three-dimensional model, the representations of the buildings in the map region for the three-dimensional model may only be extruded polygons, where the tops of the polygons are flat.

In some cases, the map tool may generate a three-dimensional model using elements from a two-dimensional data set of mapping information and from a three-dimensional data set of mapping information. For example, two-dimensional maps specifying locations and boundaries of various structures may be available to define the footprint of a given object or structure in a map area. In this example, three-dimensional mesh data corresponding to the map area may also be available, where within the highly-detailed set of data is information regarding heights of objects for a given location within the map area. The map tool may use the footprint for an object derived from the two-dimensional mapping information and extrude, or extend, the footprint into three-dimensional space using one or more height values, where the one or more height values correspond to one or more points within the footprint. In some cases, the height values are determined from three-dimensional mapping information. This process may be repeated for each object footprint in the map area, and once each object has been similarly processed, the result is a model of a three-dimensional space for the map area derived from multiple data sets from which a map view may be rendered.

An aspect of the three-dimensional model constructed from the two data sets is that the model may not accurately represent the shape of a given building. For example, if for a given footprint a single point in the center of the footprint were correlated to the corresponding point in the three-dimensional mapping information, the footprint for the object may be extruded to the height of the point. However, it may be the case that the top of the object may not be flat. In other words, if a given object has anything but a flat top, there may be multiple height values corresponding to different points within the object footprint. To compensate for the potential inaccuracy, the map tool may, in some cases, use multiple points to determine a height, or in some cases, determine multiple height values. While the constructed model may lack some accuracy, what is gained is a decrease in computational complexity.

In some embodiments, the map tool may generate a three-dimensional model using footprint data from a two-dimensional data set and a height value corresponding to the footprint. For example, the map tool may receive mapping information that includes coordinates for various footprints of various structures within a map region, and the mapping information may also include a single height value corresponding to each footprint. In this way, the map tool may, for each footprint in a map region, extrude a respective footprint within the map region according to a respective height value for the respective footprint. Once each footprint has been extruded, the map tool may render a three-dimensional map view representing the map region, where the three-dimensional map view is based on the extruded footprints within the map region.

Mobile devices may provide a user with map navigation that includes a three-dimensional view corresponding to a current position. In some cases, the three-dimensional view may be constructed based on Global Positioning System (GPS) data, map information from other sources, or based on GPS data combined with map information from other sources. In some cases, a map view may be constructed from map information corresponding to a given address or to some other piece of information from which location information may be derived. For example, from any point on earth, a user may give a voice command to the map tool, such as "show me the front of the Metropolitan Museum of Art in New York City." In response to the voice command, the map tool, may access map information for the location of the Metropolitan Museum of Art in New York City and generate a map view to the user.

However, a map view presented to a user through a traditional mapping application on a mobile device may present a user with photographic detail of the surrounding environment. In some cases, the map view may include cars, buses, bicycles, bicycle riders, pedestrians, and other random objects, signs, or advertisements. A result may be a cluttered map view that may decrease the efficiency with which a user may navigate through the map area. Therefore, it may be beneficial, or more productive, for a user to have the option to see a simplified version of the surrounding environment. For example, a user may select a configuration setting to display, within a map view of a map application, an isometric view of structures drawn without texturing, or without any objects that are not structures. In some cases, a simplified map view may be a default setting, requiring no action from a user to enable.

In some embodiments, the map view provides a user with a bird's eye virtual camera view with photographic detail of the surrounding environment. In other embodiments, the map view provides a user with ground level virtual camera view from the perspective of the user's location within the displayed map area. In other embodiments, a user may choose the virtual camera perspective location from which the map view may be generated.

In some cases, the map view may be composed of various geometric figures and may be considered a low resolution proxy of the actual, or high resolution version of the surrounding environment. In either the bird's eye view, ground level view, or the isometric view of geometric figures, the map tool may use one or more sources of map information to construct the map view. In some cases, a data source containing of two-dimensional information may be combined with another data source containing three-dimensional information in order to generate a three-dimensional map view. In other cases, a three-dimensional source of mapping information alone may serve as a basis on which to construct a three-dimensional model of the surrounding environment.

In some cases, a user may manipulate a given map view such as through input indicating to the map tool to display a different virtual camera perspective of the map view. For example, within a given map view, a user may wish to see the map view from the other side of a building. However, given that the previously generated model of the map view has already been constructed, the map tool does not need to generate a new 3D model of the map view because the locations and spatial dimensions of object in the previously generated model remain valid for the new virtual camera perspective.

In an embodiment, three-dimensional (3D) data may be 3D mesh data, which may contain data defining the location and orientation of thousands of triangles for a given map view. Further in this embodiment, two-dimensional (2D) data may be obtained from maps for a given city or county which define the locations and the dimensions of footprints for structures, roads, sidewalks, plazas, or other objects. In this embodiment, in the interest of speed and computational complexity, a 3D proxy may be constructed through the transformation of the 2D model into a 3D model using selected pieces of information from the 3D model to enhance the 2D model. For example, if the 2D model provides information regarding the footprint of a given building, the map tool may then reference the 3D model to identify the corresponding location of the footprint of the building. Once the location of the footprint of the building is determined in the 3D model, one or more height values may be extracted from the 3D model for the building. Now, given the footprint of the building and the one or more height values, a rough box or polygon may be extruded to one of the height values, or to some value derived from the height values in order to generate an approximate 3D shape. This process may be repeated for each object in the 2D data, thereby creating a rough, low-resolution version of the surrounding environment.

In some embodiments, a single source of data may be used, for example, the 3D mesh data for the surrounding environment. In this example, a two-dimensional grid may be created, where each grid segment may be extruded based on a height value from the 3D mesh data, where the height value from the 3D mesh data is for a location corresponding to the grid segment. In the case where a given object in the map space overlaps with multiple grid segments, the display of adjacent grid segments may be smoothed into a contiguous three-dimensional object. In this way, a 3D model of the map space may be constructed using only height values extracted from the 3D mesh data.

In different embodiments, the map tool may adjust the granularity of the constructed 3D model based on various factors. For example, a user may choose a configuration setting to display different levels of detail in the 3D model, and in response, the map tool may construct the 3D model using additional information from the one or more source data sets of mapping information.

In some embodiments, a map tool on a mobile device, given multiple data sets of mapping information corresponding to a map or map area, may construct a three-dimensional model on which to base a map view to display. The map tool may receive two or more data sets of mapping information corresponding to a map region. In some cases, the mapping information is vector data and not raster image data.

Based on the received two or more data sets of mapping information, the map tool may determine one or more spatial dimensions for one or more objects in the map region. For example, the map tool may receive three-dimensional mapping information for the map region from Map Service 380 or from GPS 390. The map tool may also receive, from Map Service 380 or service 382 for example, two-dimensional mapping information that includes footprint information for buildings within the map region for which the three-dimensional mapping information corresponds. Further, the footprint may be the footprint of any object within the map region.

Given a footprint and the area of the map region in which the footprint exists, and given three-dimensional information corresponding to the map region, the map tool may determine one or more height values for the footprint. The map tool may use one or more points within the footprint, or points proximate to the footprint, and correlate the one or more points to respective one or more height values from the three-dimensional mapping information, where each respective height value corresponds to a respective point. In this way, the map tool may determine a height value for each of the points in the footprint. A result is that the map tool, based on two different data sets of mapping information, determines one or more spatial dimensions for one or more objects in the map region. In this example, spatial dimensions are determined from the two-dimensional mapping information (footprints) and spatial dimensions are determined from the three-dimensional mapping information (height values).

In some embodiments, a footprint may be divided into multiple regions, and height values may be correlated to the three-dimensional information for one or more locations within each of the regions. For example, a building may be L-shaped, where one leg of the L is not as tall as the other leg of the L. In this case, the footprint may be divided into two regions, one region corresponding to each leg of the L, and a height value for each region may be used as the basis for extruding the footprint into three dimensional space. The regions of the footprint may be determined in other manners, such as uniform division of the footprint into any given number of regions, for example, dividing each footprint into quarters.

Once the map tool has identified one or more height values corresponding to one or more points in a given footprint, the map tool may generate a three-dimensional version of the footprint. The map tool may generate an entire three-dimensional model based on the three-dimensional versions of each object footprint in the map region. For example, the map tool may extrude or extend the object footprint into three-dimensional space based on the height value. The generated three-dimensional model has a higher level of granularity than the two-dimensional mapping information in that the three-dimensional model includes height values in addition to the footprint information. The generated three-dimensional model also has a lower level of granularity than the three-dimensional mapping information in that the three-dimensional model does not have as much detail regarding the dimensions of objects within the map region. In other words, in this example, the generated three-dimensional model has a different level of granularity from each of the sets of mapping information on which the three-dimensional model is based.

Figure 5A:
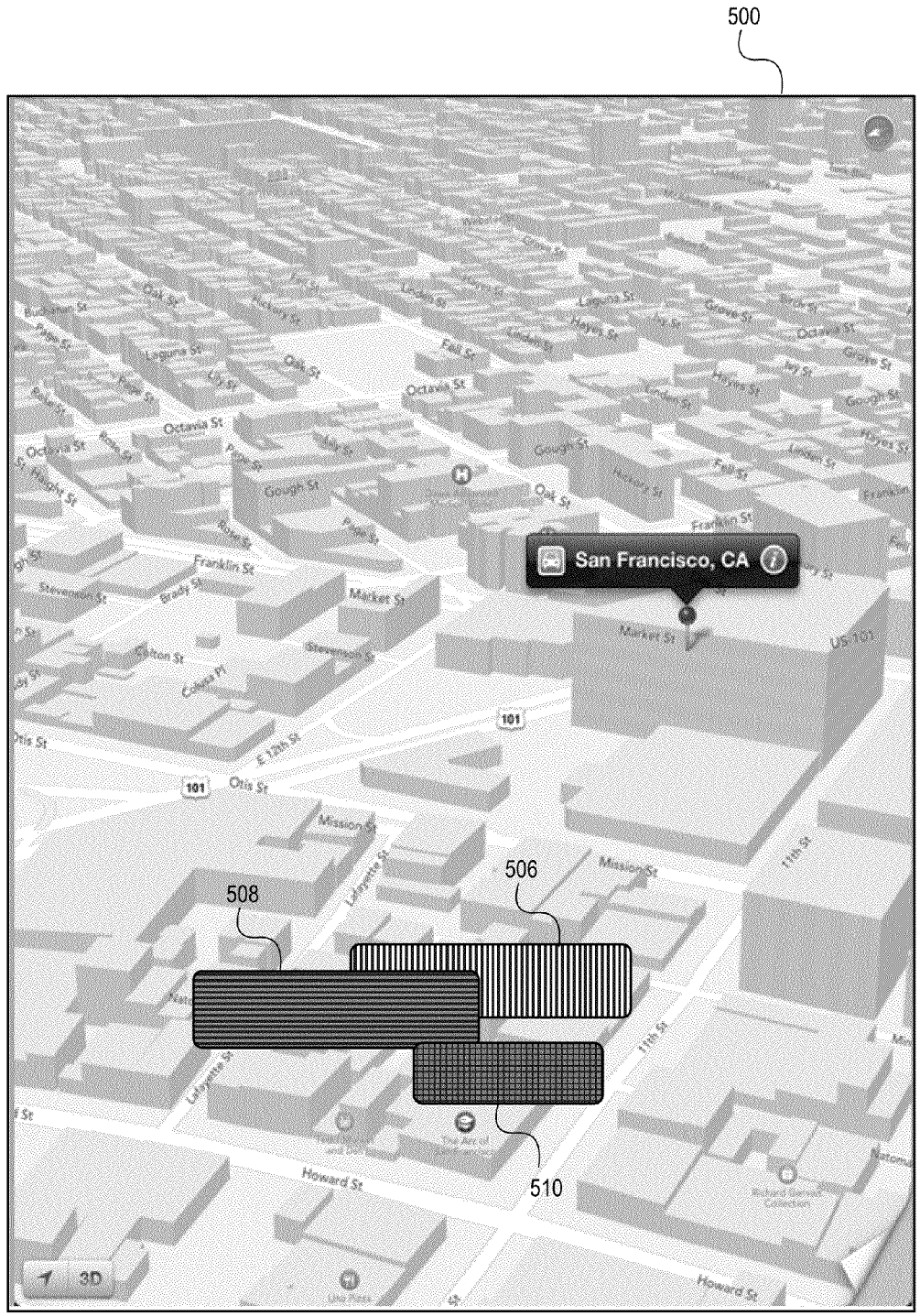
FIGS. 5A-5C depict illustrations of various map views of different zoom levels, according to some embodiments.
Figure 5B:
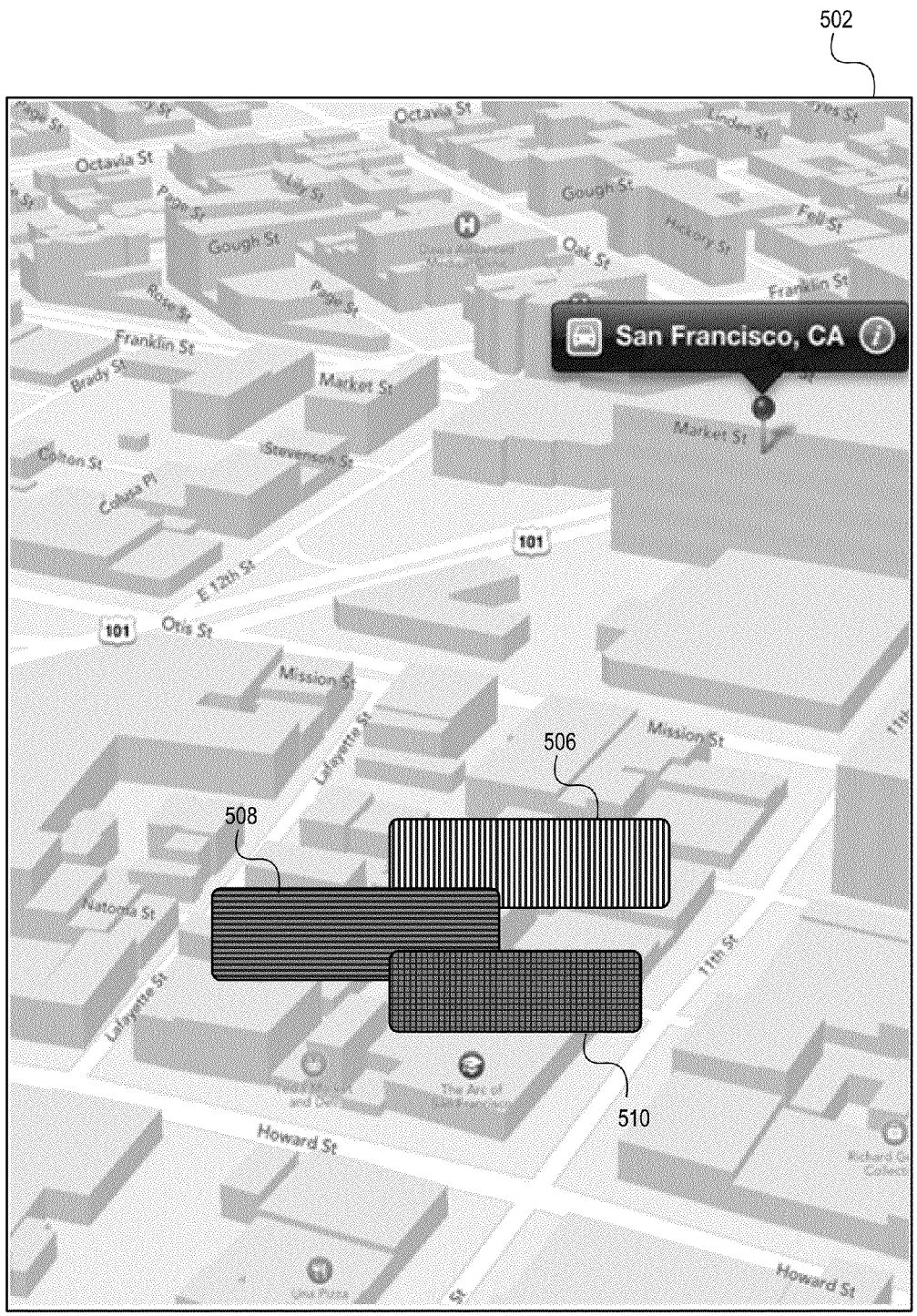
Figure 5C:
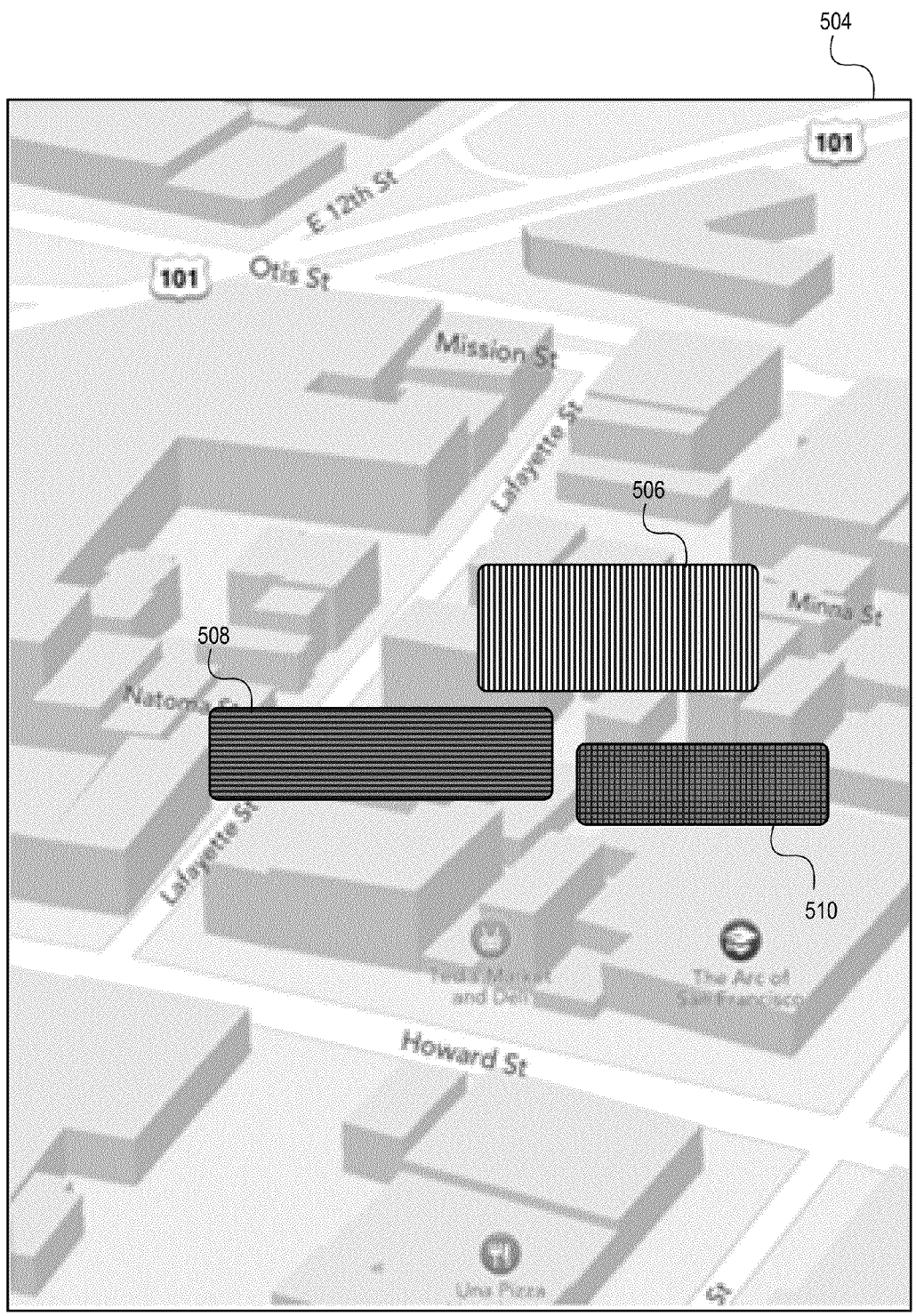

The generated three-dimensional model may then serve as the basis for the generation of a display of the map area such as the map view in FIG. 5A. In some cases, the three-dimensional model may be augmented to include additional details, such as texture and shading for one or more objects within the three-dimensional model, or doors or windows or outlines of doors or windows. The additional details may be extracted from the mapping information already used, or the additional details may be based on another source of mapping information. For example, the map tool may use the cardinal direction of the user with respect to the current position of the sun to add accurate shading information to objects within the three-dimensional model. In other cases, the map tool may access a default settings file to apply default textures to various objects such as buildings or streets.

As discussed above, a simplified map view may provide a user with a more efficient map using experience. Overall, without distractions such as advertisements, vehicles, or people, the simplified map view is easier to comprehend and easier to navigate.

In some cases, the map tool may render a map view based on raster data. The photographic detail may provide a user with a general impression of the map area. However, with respect to navigation, a user may find the building details and cars a distraction. By contrast, the map tool may also render map views based on a generated three-dimensional model, which may be aesthetically cleaner and simpler, and as a consequence, the street and building images are easier to visually process. While some visual details are lost, the gain in the ease of identifying streets and buildings may be a preferable outcome to a user more interested in navigating than in the shape of a roof or how many air conditioning units are on a given roof. In some embodiments, when the two-dimensional mapping information discussed above indicates a green space such as a park, the map tool may display a flat area without buildings. Further, in some cases, flat areas may be colored to indicate that the area is a green space, or the flat area may be colored blue to indicate that the area is a body of water.

In some embodiments, a map tool may receive input indicating a location in a map. For example, a user of multifunction device 300 or a user at a desktop computer may enter an address or otherwise indicate a certain location, such as Austin Children's Museum or the corner of Sixth Street and Congress Avenue.

Given a location in a map, the map tool may receive or request two-dimensional mapping information for the map. For example, the map tool may receive or request from Map Service 380 mapping information including footprints for objects within the area indicated through the location in the map.

Given the location in the map, the map tool may also receive or request height information for the map. For example, the map tool may receive or request from Map Service 380 mapping information that includes height values for various objects within the area indicated through the location in the map. The mapping information may be vector data instead of raster data.

The map tool may then, similar to the process described above, correlate a location or point in the footprint of an object in the map region with a height value from the height information. In some cases, one or more points in or proximate to the footprint may be correlated to respective height values in the height information. For example, height values for each corner of the footprint, or a points along the perimeter, or only a single height value for somewhere near the center of the footprint. In some cases, given multiple points within the footprint, the map tool may select the highest height value from the respective, corresponding height values. In other cases, the map tool may calculate an average height value from the multiple height values corresponding to the respective points in the footprint. In other cases, the height and top of the extruded footprint may be created through the creation of a surface connecting each of different height values within a given footprint.

Similar to the creation of a three-dimensional model described above, the map tool may render a three-dimensional representations of the objects based on the height information, where the rendering includes extruding a respective footprint for each object to create a respective three-dimensional version of the object through the addition of a height value, or height values, or a height value based on multiple height values. In some cases, the map tool may represent the collection of extruded footprints within a data structure storing the defining information for each of the extruded footprints, in addition to information for where within the map region the given extruded footprint exists.

Given a rendering of each extruded footprint, which is a three-dimensional object, the map tool may display a three-dimensional version of the three-dimensional object in a view of the map region. Upon displaying each of the generated three-dimensional objects, a user may see a version of the map region that is a simplified version of the map region, as compared to a raster-based map view or a photo-realistic version of the map region.

In some embodiments, the map tool may receive or request two-dimensional mapping information for a map or map region, where the two-dimensional mapping information includes a footprint for an object. The map tool may also receive or request three-dimensional mapping information for the map region, such as mesh data from Map Service 380, where the three-dimensional mapping information includes multiple height values corresponding to one or more locations in the map.

Given the two different kinds of mapping information, the map tool may correlate a given location of the footprint of the object with a respective height value from the multiple height values in the three-dimensional mapping information. In order for the correlation between the locations in the two-dimensional mapping information to height values in the three-dimensional mapping information to be valid, both sets of mapping information depict or describe an overlapping area of the map or map region.

Given a footprint for an object and at least one height value corresponding to the footprint, the map tool may extrude the footprint, based on the height value, to create a three-dimensional version of the object. The map tool may then display the three-dimensional version of the object. In the general case, the map tool may perform repeat the correlating and extruding processes for each footprint in the map region in order to display a complete three-dimensional view of the map region.

In some embodiments, the map tool may begin with the creation of a representation of map area, where the representation is divided into segments defined in terms of two-dimensional space. For example, the map area may correspond to a 200 square meter area, and each segment may be defined to correspond to a square meter. In other cases, segments may be defined in terms of other shapes.

The map tool may then request or receive three-dimensional mapping information for the map, where the three-dimensional mapping information includes height values corresponding to at least one point in each segment location. The map tool may then correlate a respective height value for each of the segments. In some cases, for a given segment, the map tool may correlate a height value from the center of the segment and for a point along each side of the segment.

Given the segments and respective height values, the map tool may generate a three-dimensional version of the segment through the addition of a respective height value to a respective segment. In this way, the map tool creates an extruded, three-dimensional version of the two-dimensional segment. This process may be repeated for each segment.

At this point, the map tool has generated a model with multiple segments of varying heights and may display a three-dimensional view of the map based on the model. If each of the segments is displayed as defined within the model, the result may be a mesh-like display of segments with lines bounding each segment. Therefore, in some cases, the map tool may smooth the segments, for example, if the height difference between adjacent segments is zero, small, or within a threshold value, then the map tool may merge the segments into one segment such that each adjacent side of the individual segments become a single surface. This process may be repeated for each segment in the model.

Given a map view based on the generated three-dimensional model, the map tool may receive input corresponding to a navigation operation or to a change in virtual camera viewpoint. For example, a user may wish to see, given a display of a building within a map view, the view from the other side of the building. In such a case, through a finger swipe, other gesture on a touch-sensitive screen, the map tool may update the map view in response to the user input. Further, given that the model information already exists within the model, the model does not need to be regenerated, meaning that no new mapping information is needed to provided the user with a new view of the map area.

In some embodiments, only footprints are subdivided into segments, and the after the map tool performs the above-described smoothing/merging operation, the resulting three-dimensional version of the footprint may have a more accurate representation of the top of the building since each of the tops of each segments would have been smoothed together into one surface.

In some embodiments, a map view is updated as the user and multifunction device change positions or as a user on a desktop computer navigates within a map view. In such a case, the map view may be updated based on a combination of an already computed three-dimensional model augmented with computed model information for the new area displayed in the map as a result of the change in location. In this way, in this case, a complete recalculation of the 3D model is avoided, and only the area of the map that is new is used to augment the already generated 3D model.

In some cases, based on a projection of where the user is going, the map tool may prefetch corresponding mapping information, and if the projection is wrong or partially wrong, some or all of the prefetched mapping information may be discarded.

In some embodiments, the map tool may generate, based on multiple data sets, a three-dimensional model of a map region including multiple three-dimensional objects. The map tool may generate the three-dimensional model according to any of the above described method for generating a three-dimensional model.

The map tool may then display a map view based on the three-dimensional model. The map tool may, through an interface, input indicating a selection of an object in the three-dimensional model. In the case of a mobile device, the interface may be a touch-sensitive display screen. In the case of a desktop computer, the interface may a window and the input may be a selection of an object displayed in the window. In either case, based on the input, the map tool determines an object in the displayed three-dimensional model to select.

In some cases, given a map view, a user may adjust the virtual camera perspective from which the map is drawn. For example, given a constructed three-dimensional model as described, a user may view different sides of a building in the map view without using additional mapping information and based solely on the already constructed three-dimensional model.

Given a selected object, the map tool may invoke a function that extracts data from one or more of the data sets of mapping information from which the three-dimensional model was generated or from other data related to the map region. In some cases, the user may choose to display additional information regarding the selected object. For example, on a mobile device, a user may tap and hold a finger over a displayed object in the map view, the map tool may then provide the user with various options, such as adding a label, displaying an already assigned label for the object, displaying information regarding businesses within the building, whether or not the selected object is a point of interest, whether or not the object includes a restroom, among other options. In the case that the user adds a label, the user may choose for the label to be shared and the label information may be uploaded to Map Service 380 to be provided to other users. In some cases, the map tool may retrieve the additional information from Map Service 380.

In some cases, Map Service 380 may provide information collected from other users that have previously provided feedback or information regarding the selected object. This crowdsourced information may include such things as ratings for a restaurant within the building, comments on the cleanliness of a public restroom, or hours of operation of any businesses within the building.

In the case that the user selection may be satisfied based on the already received mapping information, the map view may be updated based on the specified function and data extracted from the mapping information data sets. For example, if the user selects to display a selected building with greater texture detail, the map tool may extract the information from the multiple data sets described above. However, in other cases, as described above, the map view may be updated based on information from other data sources.

Example Computer System

Figure 9:
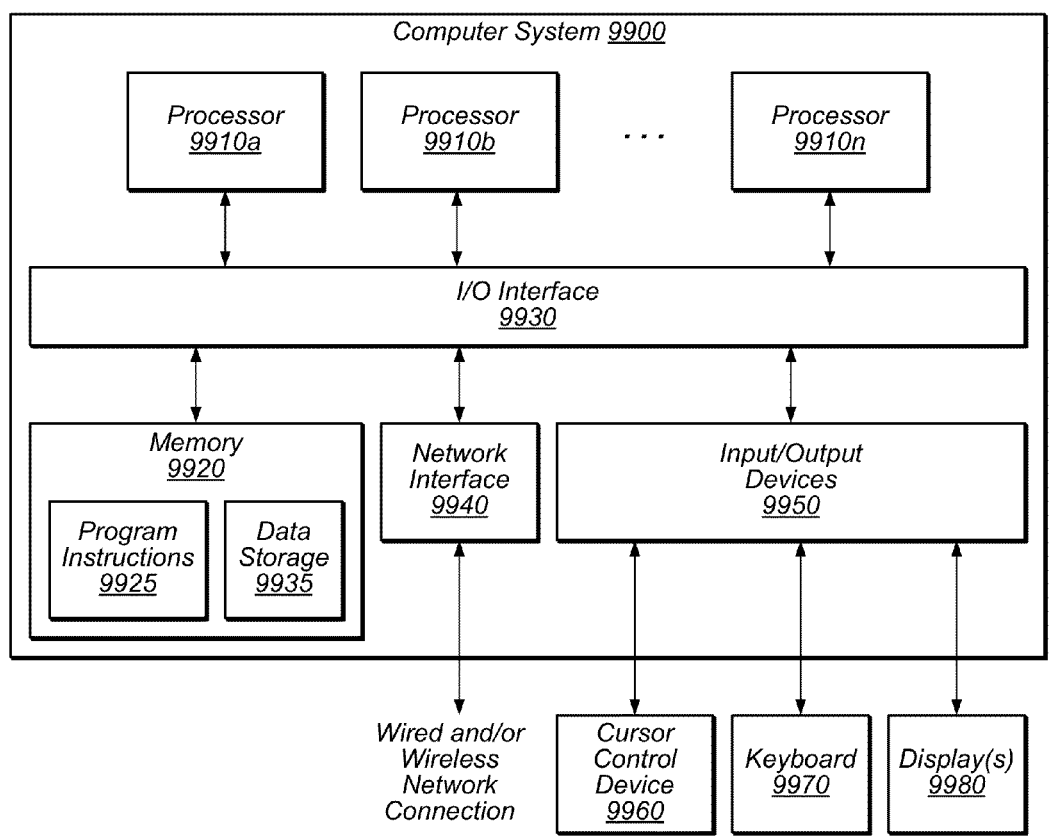
FIG. 9 depicts elements of an example computer system capable of implementing a roof analysis tool.

FIG. 9 illustrates computer system 9900 that may execute the embodiments discussed above. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 9900 includes one or more processors 9360$a$-9360$n$ coupled to system memory 9370 via input/output (I/O) interface 9380. The computer system further includes network interface 9390 coupled to I/O interface 9380, and one or more input/output devices 9382, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 9370 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally, a computer-accessible medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or through a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A method, comprising:
performing, by one or more computing devices:
accessing, for points of interest in a map region, ranking data for the points of interest;
determining, for a current display area of a map view of the map region, that a display of a designation for a point of interest of the points of interest would not interfere with a display of a designation for a higher ranked point of interest;

determining, for an expanded display area of the map view, that the display of the designation of the point of interest in the expanded display area of the map view would not interfere with a display of a designation for an other higher ranked point of interest; and in response to said determining that the display of the designation for the point of interest would not interfere with the display of the designation for the higher ranked point of interest in the current display area of the map view and would also not interfere with the display of the designation for the other higher ranked point of interest in the expanded display area of the map view:

displaying the designation for the point of interest in the current display area of the map view for the map region.

2. The method of claim 1, wherein the ranking data is organized according to multiple hierarchical levels, and wherein the points of interest corresponding to a given hierarchical level are further ranked according to a quantity of ranking information and ranking information.

3. The method of claim 2, wherein the points of interest are from a single classification corresponding to a single hierarchical level.

4. The method of claim 1, wherein the expanded display area is displayed in response to zooming out of the map view.

5. The method of claim 1, wherein the expanded display area is displayed in response to panning across the map view.

6. The method of claim 1, wherein said displaying displays no more than a threshold amount of designations for points of interest in the current display area of the map view.

7. The method of claim 1, wherein said displaying prevents a designation of a point of interest displayed in the current display area of a map view from not being displayed at the expanded display area of the map view.

8. A method, comprising:

performing, by one or more computing devices:

accessing, for points of interest displayable in a map view of a map region, ranking data for the points of interest;

determining an augmented map view based on the map region as augmented by an additional map region surrounding the map region;

in response to determining that a display of the designation for the point of interest would not interfere with a display of a designation for a higher ranked point of interest within the augmented map view:

displaying the designation of the point of interest within a map view of the map region.

9. The method of claim 8, wherein the additional map region corresponds to a map view area based on a size of a largest expected area to be occupied by a displayed designation in the map view of the map region.

10. The method of claim 8, wherein the additional map region surrounds the map region.

11. The method of claim 8, wherein said displaying prevents a designation of a point of interest displayed for the map view from not being displayed when the map view corresponds to a panning into the map region including the additional map region.

12. A system, comprising:
a computing device comprising at least one processor; and
a memory comprising program instructions, wherein the program instructions are executable by the at least one processor to:

access ranking data for points of interest in a map region;

display, based on the ranking data and based on a hierarchical level corresponding to a current display area of a map view, a designation for a highest ranked point of interest in the map region;

determine, for respective points of interest corresponding to the current display area of the map view, whether a respective designation for the respective point of interest overlaps with a displayed designation;

determine, for the respective points of interest corresponding to the current display area of the map view, whether a respective designation for the respective point of interest overlaps with a designation for a higher ranked point of interest in an expanded display area of the map view; and display a respective designation for respective points of interest for which the respective designation is determined not to overlap with a displayed designation at the current display area of the map view and for which the respective designation is determined not to overlap with any designation for any higher ranked point of interest in the expanded display area of the map view.

13. A non-transitory, computer-readable storage medium storing program instructions, wherein the program instructions are computer-executable to implement:

accessing, for points of interest in a map region, ranking data for the points of interest;

determining, for a current zoom level of a map view of the map region, that a designation for a point of interest in the map view would not interfere with any designation for any higher ranked point of interest to be displayed in any expanded display area of the map view;

determining a nearest increased zoom level at which any designation for any higher ranked point of interest would be displayed and would interfere with the designation for the point of interest; and in response to determining that a number of zoom levels between the current zoom level and the nearest increased zoom level is greater than a threshold amount of zoom levels:

displaying the designation for the point of interest in the map view.

14. The non-transitory, computer-readable storage medium of claim 13, wherein said determining the nearest increased zoom level at which the designation for the other higher ranked point of interest would be displayed further comprises determining that the designation for the other higher ranked point of interest would overlap with a displayed designation in the map view.

15. The non-transitory, computer-readable storage medium of claim 13, wherein the threshold amount of zoom levels is greater than two.

16. The non-transitory, computer-readable storage medium of claim 13, wherein said displaying the designation for the point of interest is based on a configurable setting corresponding to an option to display a greater amount of ranking information earlier instead of displaying information that is more relevant at an increased zoom level.

17. The non-transitory, computer-readable storage medium of claim 13, further comprising:
when the map view is at the nearest increased zoom level:
continuing to display the designation for the point of interest instead of displaying the designation for any higher ranked point of interest with a designation that interferes with the designation for the point of interest.

18. A method, comprising:
performing, by one or more computing devices:
accessing, for points of interest in a map region, ranking data for the points of interest;
determining, for a current zoom level of a map view of the map region, that a designation for a point of interest in the map view would not interfere with a designation for a higher ranked point of interest;
determining an increased zoom level at which a designation for another higher ranked point of interest would be displayed and would interfere with the designation for the point of interest; and
in response to determining that a number of zoom levels between the current zoom level and the increased zoom level is greater than a threshold amount of zoom levels:
displaying the designation for the point of interest in the map view.

19. The method of claim 18, wherein the ranking data is organized according to multiple hierarchical levels, and wherein the points of interest corresponding to a given hierarchical level are further ranked according to a quantity of ranking information and ranking information.

20. The method of claim 18, wherein the points of interest are from a single classification corresponding to a single hierarchical level.

21. The method of claim 18, wherein said displaying displays no more than a threshold amount of designations for points of interest in the current zoom level.

22. The method of claim 18, wherein said displaying prevents a designation of a point of interest displayed in the current zoom level of a map view from not being displayed at the increased zoom level of the map view.

23. The method of claim 18, wherein said determining the nearest increased zoom level at which the designation for the other higher ranked point of interest would be displayed further comprises determining that the designation for the other higher ranked point of interest would overlap with a displayed designation in the map view.

24. The method of claim 18, wherein the threshold amount of zoom levels is greater than two.

25. The method of claim 18, wherein said displaying the designation for the point of interest is based on a configurable setting corresponding to an option to display a greater amount of ranking information earlier instead of displaying information that is more relevant at an increased zoom level.

* * * * *